United States Patent [19]

Liebel, Jr.

[11] 3,766,532

[45] Oct. 16, 1973

[54] DATA PROCESSING SYSTEM HAVING TWO LEVELS OF PROGRAM CONTROL

[75] Inventor: John T. Liebel, Jr., Williamsville, N.Y.

[73] Assignee: Nanodata Corporation, Williamsville, N.Y.

[22] Filed: Apr. 28, 1972

[21] Appl. No.: 248,689

[52] U.S. Cl. .............................................. 340/172.5
[51] Int. Cl. ............................ G06f 13/00, G06f 9/10
[58] Field of Search .................................. 340/172.5

[56] References Cited

UNITED STATES PATENTS

| | | | |
|---|---|---|---|
| 3,614,746 | 10/1971 | Klinkhamer | 340/172.5 |
| 3,333,252 | 7/1967 | Shimabukuro | 340/172.5 |
| 3,602,896 | 8/1971 | Zeheb | 340/172.5 |
| 3,359,544 | 12/1967 | Macon et al. | 340/172.5 |
| 3,533,077 | 10/1970 | Bell et al. | 340/172.5 |
| 3,553,653 | 1/1971 | Krock | 340/172.5 |

*Primary Examiner*—Paul J. Henon
*Assistant Examiner*—Mark Edward Nusbaum
*Attorney*—Conrad Christel et al.

[57] ABSTRACT

A data processing system comprising a local storage means for storing information to be processed and operation means connected to the local storage means for performing operations, such as arithmetic and logical, on information supplied thereto. A first storage means contains a plurality of microinstructions each having an operation code which are selected by addressing means connected to the local store. A second storage means contains a plurality of words which are selected by an addressing means connected to the first storage means which supplies a current address of the highest priority from a plurality of address sources, one of which includes the operation code of the selected microinstruction. A control means receives selected words gated from the second storage means and for each word provides control functions of a first type having a particular execution time duration and of a second type comprising a plurality of portions presented in a sequence during the word, the portions having equal execution time durations which in sum equal the time duration of the control functions of the first type. The control functions are connected to various parts of the system for example to gate buses to and from the local store and other parts, to select particular arithmetic and logical operations, and to control the addressing means.

16 Claims, 15 Drawing Figures

DATA PROCESSING SYSTEM HAVING TWO LEVELS OF PROGRAM CONTROL

BACKGROUND OF THE INVENTION

This invention relates to digital data processing systems, and more particularly to a microprogram computer having two levels of program control.

Digital computers operate in accordance with a sequence of instructions known as a program which is selected and arranged by the programmer or operator of the computer to solve particular problems. The program for the computer can be separated into a set of machine operations such as addition, multiplication, and the like, which are at the programmer's disposal. Inside the machine, these machine operations can be separated into a set of micro-operations such as shifting, counting, word transfer and the like, which are at the machine designer's disposal. A portion of each machine language instruction in the machine is a number called the operation code, and this number is sent to the machine control unit to select one of a number of possible execution sequences. Originally these sequential machine operations were controlled by the wired-in logic of the computer, and the programmer was unable to alter the machine instructions made available to him.

In recent times digital computers have been constructed according to the concept of microprogramming whereby wired-in logic of the machine, and hence the internal machine instructions, can be readily modified to provide the programmer with more flexibility. The concept of microprogramming, briefly, is the changing of the basic operations that take place during each clock interval of sequence of the basic machine operations. In a microprogram computer, the operation code of a machine instruction is used as an address into a fast control memory or control store. The microprogram starting at that address is executed to achieve the desired control function. As a result, machine instructions, and hence the functional nature of the computer as seen by the programmer, are determined by the microprogrammer, and may be redefined as readily as the control store may be reprogrammed.

SUMMARY OF THE INVENTION

It is a primary object of the present invention to provide a new and improved microprogram computer which is capable of extremely flexible and high speed operation.

It is a further object of the present invention to provide such a computer which allows the user to define system instructions and architecture and if desired also dynamically at the system speed.

It is a further object of the present invention to provide such a computer which is capable of parallel operation with a relatively large number of data paths.

It is a further object of this invention to provide such a computer which achieves a useful compromise between horizontal and vertical microprogramming.

It is a further object of this invention to provide such a computer wherein the instructions co-operate in a manner providing a flexible combination of instantaneous and residual control.

It is a further object of the present invention to provide such a computer which is capable of emulating other machines.

The present invention provides a data processing system including a first storage means for storing a plurality of instructions each including an operation code and wherein words are fetched from a second storage means in a manner utilizing the operation code of instructions selected from the first storage means. A control means receives words gated from the second storage means for providing control functions to control the system, the control means providing control functions of a first type and control functions of a second type, the functions of the second type changing while the functions of the first type remain constant. In particular, the control functions of the first type have a particular execution time duration and the control functions of the second type comprise a plurality of portions which are presented in a sequence, these portions having time durations which in sum equal the time duration of the control functions of the first type.

The foregoing and additional advantages and characterizing features of the present invention will become clearly apparent upon a reading of the ensing detailed description together with the included drawing wherein:

BRIEF DESCRIPTION OF THE DRAWING FIGURES

DETAILED DESCRIPTION OF THE ILLUSTRATED EMBODIMENT

General System Description

Figure 1:
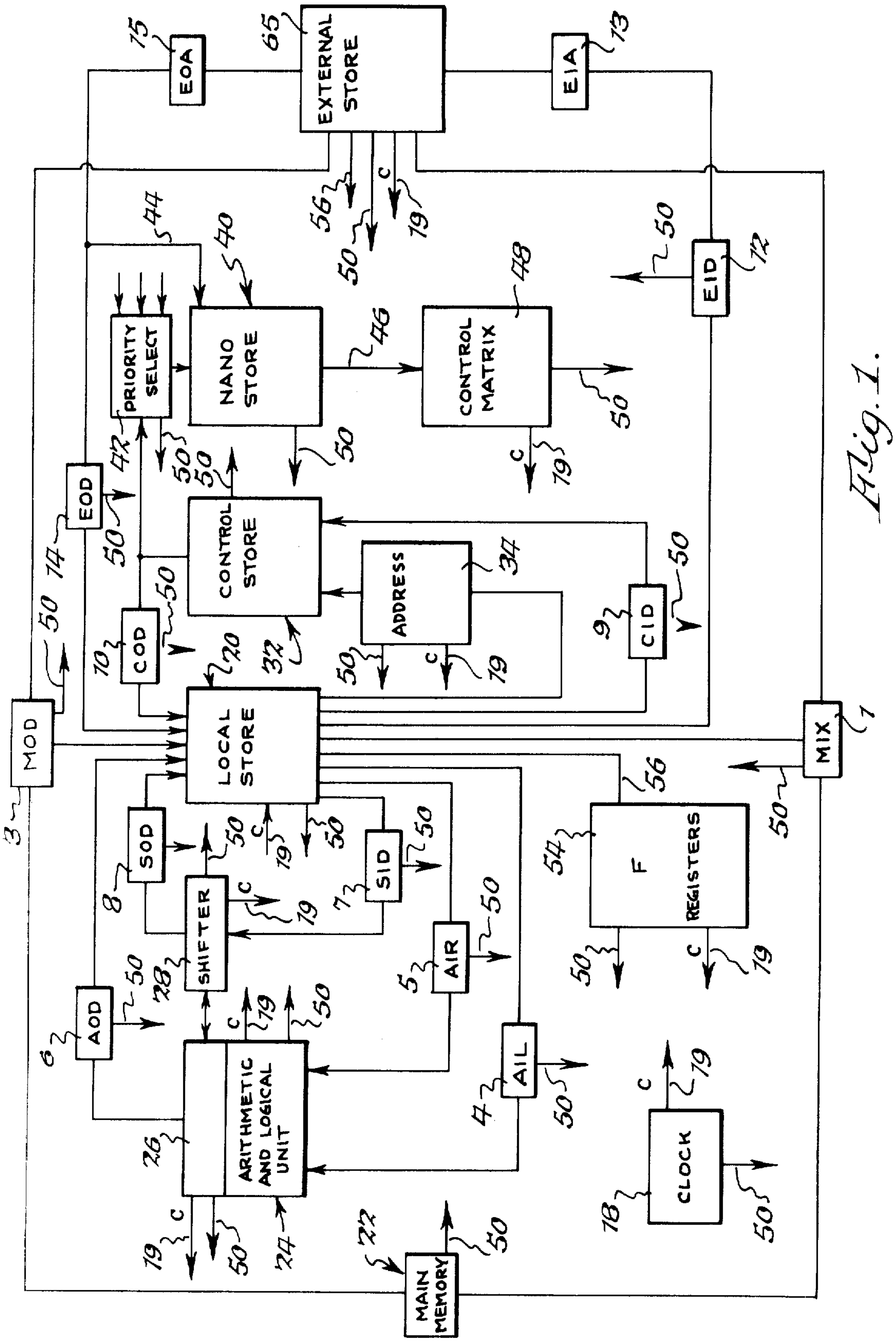
FIG. 1 is a schematic block diagram of a digital data pro-cessing system according to the present invention.

FIG. 1 shows in block diagram form a processor according to the present invention and included in a data processing system. Buses indicated at 1–15, under program control, connect together the various components of the processor. The buses also are designated by standard three-letter mnemonics: The first letter corresponds to the unit; the second refers to direction, either input or output, from the viewpoint of the named unit; and the third refers to either data or address. A local storage means designated 20 comprises a plurality of registers which provide the working registers for the data processing system. Each of the registers stores a plurality of bits, the bit capacity of each determining its length, and in the present illustration the registers of storage means 20 are 18 bits in length. Storage means 20 includes, for example, a set of general purpose registers for use as determined by the programmer, and a micro-instruction register for storing this particular instruction. Another set of registers in storage means 20 can be incremented by a variable amount, independent of any other operation, in a manner which presently will be described.

Storage means 20 is connected to the main memory 22 of the data processing system by buses 1 and 3 also designated MIX and MOD, respectively, which buses are 18 bits wide cor-responding to the length of the registers of local storage means 20. It is to be understood that the abbreviated block diagram representation of memory 22 is intended to include the usual arrangement or address and storage registers which are included with a memory unit in standard data processing systems. One form of memory 22 is found to perform satisfactorily with the present invention is a core memory unit of 18 bit words, with up to 256 K words available, having a full cycle time of 750 nanoseconds, and a read access time of less than 400 nanoseconds. Memory 22 is readable and writable, and parity protection is implemented on read and write operations. Separate buses could be provided to transmit data and address information from storage means 20 to memory 22. However, when writing into main store 22 the data need not be present until approximately 300 nanoseconds after the address is given to main store 22, so a single bus 1 is provided for carrying address and data information from local store 22 to main store 22, and bus 1 is time-shared between the address and data functions under program control to be described in detail presently. After being fetched, a word from main store 22 may be gated to local store 20 by bus 3.

The data processing system further comprises an arithmetic and logical unit 24 which operates on the two values transmitted to it by buses 4 and 5, and the particular operation is determined by an operation code also transmitted to unit 24. In particular, unit 24 of the present illustration performs any of 16 logical operations, with or without carry logic. When the latter is specified, such arithmetic operations as addition and subtraction are executed. Unit 24 produces an 18 bit result and four condition bits: carry, overflow, sign and non-zero result. Unit 24 also includes a register portion 26 for holding the result temporarily whereupon it is transmitted by bus 6 to storage means 20. A shifter 28 also is provided and comprises a register which can be used in conjunction with the result hold register 26 of unit 24 or independently to shift single or double length quantities. Shifter 28 is connected to local storage means 20 by buses 7 and 8.

The system further comprises a control storage means 32 which contains the micro-instructions which comprise a microprogram for control of the data processing system at a first level of program storage. Storage means 32 comprises a semiconductor memory unit which is both readable and writeable, and in this particular illustration contains up to 32K words which are 18 bits in length. Storage means 32 has a full cycle time of 150 nanoseconds and a read access time of approximately 120 nanoseconds. Address information for control store 32 is provided by an addressing means 34 which, in turn, is connected to local store 20 and to other components of the system as will be described in detail presently. Data words from local store 20 are transmitted to storage means 32 by a bus 9. The output of storage means 32 is transmitted by a bus 10 to local storage means 20. The abbreviated block diagram representation of storage means 32 is intended to include the usual arrangement of address and storage registers which are included with a control store.

In accordance with this invention, there is provided a storage means 40 for storing words which define the program at a second level of storage for control of the data processing system. Storage means 40, which for convenience will be designated nanostorage means 40, in the present illustration contains words each having a length of 360 bits. The address of a particular word to be obtained from nanostorage means 40 can come from several sources in the system, the particular address being selected according to a priority scheme which will be described in detail presently. Suffice it to say, a priority selection means 42 provides a selected address input to nanostorage means 40, selection being among a number of sources such as the output of control store 32 which is connected by a path 43 to means 42. A data input path to nanostorage means 40 is indicated at 44. The words addressed in nanostorage means 40 are gated through a path designated 46 to a means 48 for receiving the words gated from nano storage means 40 in the form of a constant field and a plurality of time dependent fields. For convenience, means 48 also will be designated a control matrix. While the constant field of a word is present, the corresponding time dependent fields are presented in sequence. These fields, in turn, produce machine state vectors which are used to control the state of the machine or data processing system during each time interval of this portion of the program execution. In particular, at any instant in time the combination of a constant field and one of the time dependent fields from the same nanoword determines the machine state vector. In effect, the set of time dependent fields in a nanoword is a nanoprogram having the same number of steps as the number of time dependent fields in each word, which steps define the instruction. According to a preferred mode of the present invention, the constant field of each word has a duration of 240 nanoseconds, and there are four time dependent or sequenced fields, each having a duration of 60 nanoseconds, in each word.

Each constant field contains a plurality of bits which individually or in groups are used, for example, to provide operands for use by the functions in the time dependent fields, to command a particular operation to be performed by arithmetic unit 24, to prepare the system for branching as well as providing a branch address in nanostore 40, and to test various conditions in the system. These and other functions or K vectors will be described in further detail presently.

Each time dependent field contains a plurality of bits, and since sequencing of a plurality of time dependent fields occurs during the presence of each constant field, a high degree of flexibility results. The four time dependent fields or T-vectors of a nonoinstruction provide a sequence of controls at the basic clock rate of the system, with the K-vector providing residual control through the complete nanoinstruction. The bits in the time dependent field are used individually or in groups, for example, to control the unit 24 and shift means 28, to cause reading of words from the various elements such as arithmetic unit 24, shifter 28 and main store 22, to transfer the words to local storage means 20 by gating appropriate buses, to select particular registers in local store 20 in which to place the words, to causing writing at selected locations in control storage means 32 and main memory 22, to transfer selected words from local store 20 to inputs of arithmetic unit 24 and shifter 28, and to perform various tests. These and other functions or T-vectors will be described in further detail presently.

During any given time period the constant or K-vector and the current dynamic or T-vector together form the current machine state vector which is transmitted from control matrix 48 to the appropriate location in the system. In this connection, a plurality of control lines, which for convenience are collectively designated 50, connect control matrix 48 to the various buses and components, for example arithmetic and logical unit 24 and associated buses 4–6, shifter 38 and its buses 7 and 8, control store 32 and addressing means 34. For convenience in illustration, all components in the system of FIG. 1 to which control matrix 48 is connected are provided with a fragmentary line 50, it being understood that each line 50 represents a plurality of control lines which connect the system components to control matrix 48.

The data processing system of the present invention further comprises a group 54 of F registers, and in the present illustration there are 32 F registers each having a length of 6 bits. Some of the F registers included in group 54 are used to specify the attachment of the buses shown in FIG. 1 to the registers in local storage means 20 as determined by the values in the F registers, and line 56 indicates schematically the connection of group 54 to local store 20 for this purpose. The remaining F registers in group 54 are used, for example, to serve as a counter, to store indicator bits for testing, and to hold an address for selecting a fast increment register in local storage means 20. Table II lists the various F registers of group 54 with the corresponding functions, and a detailed description of the construction and operation of the F registers together with the manner in which values are supplied to these registers will be provided presently.

The system further comprises an external storage means 65 which comprises a plurality of registers. Some of the registers in storage means 65 are connected to peripheral equipment and other registers provide interrupt indications and masking. Another group of registers in external storage means 65 store the values which are used to increment the several fast incrementing registers in local storage means 20. Main storage means 20 is connected through buses 1 and 3, i.e. MIX and MOD, respectively, to storage means 65. When the F registers are provided with values greater than a certain number, these registers then address registers of external storage means 65 instead of registers of local store 20. Buses 12 and 13, also designated EID and EIA respectively, connect registers of local store 20 to external store 65. The F register associated with bus EID points to the register of local store 20 from which data is to be transmitted, while the value in the F register associated with bus EIA specifies the register of storage means 65 into which the data is to be transmitted. Similarly, buses 14 and 15, also designated EOD and EOA respectively, connect registers of external storage means 65 to registers of local store 20. The F register associated with bus EOA points to the register of external store 65 from which data is to be transmitted, while the value in the F register associated with bus EOD specifies the register of local store 20 into which the data is to be placed.

A source of clock or timing pulses for the system is shown at 18 in FIG. 1, and the pulses generated by source 18 are transmitted to various components by line 19, also designated C. For convenience in illustration fragmentary portions of line 19 are shown at the point of application to each component, such as arithmetic unit 24, it being understood that all of these lines are connected to the output of source 18. Each clock or timing pulse has a duration of 60 nanoseconds.

The following definitions will facilitate an understanding of the construction and operation of the various components of the data processing system shown in FIG. 1. A nanofunction is a basic operation which can be initiated by the presence of a bit in the machine state vector during the basic clock period of the machine, which in the present illustration is 60 nanoseconds. A nano processor is defined by the specification of all the nanofunctions that are possible in the machine. A nanoprogram is a sequence of machine state vectors executed as the result of a fetch operation from control storage means 32. A micro processor is defined by writing a general set of nanoprograms and specifying the corresponding micro instructions.

Figure 2:
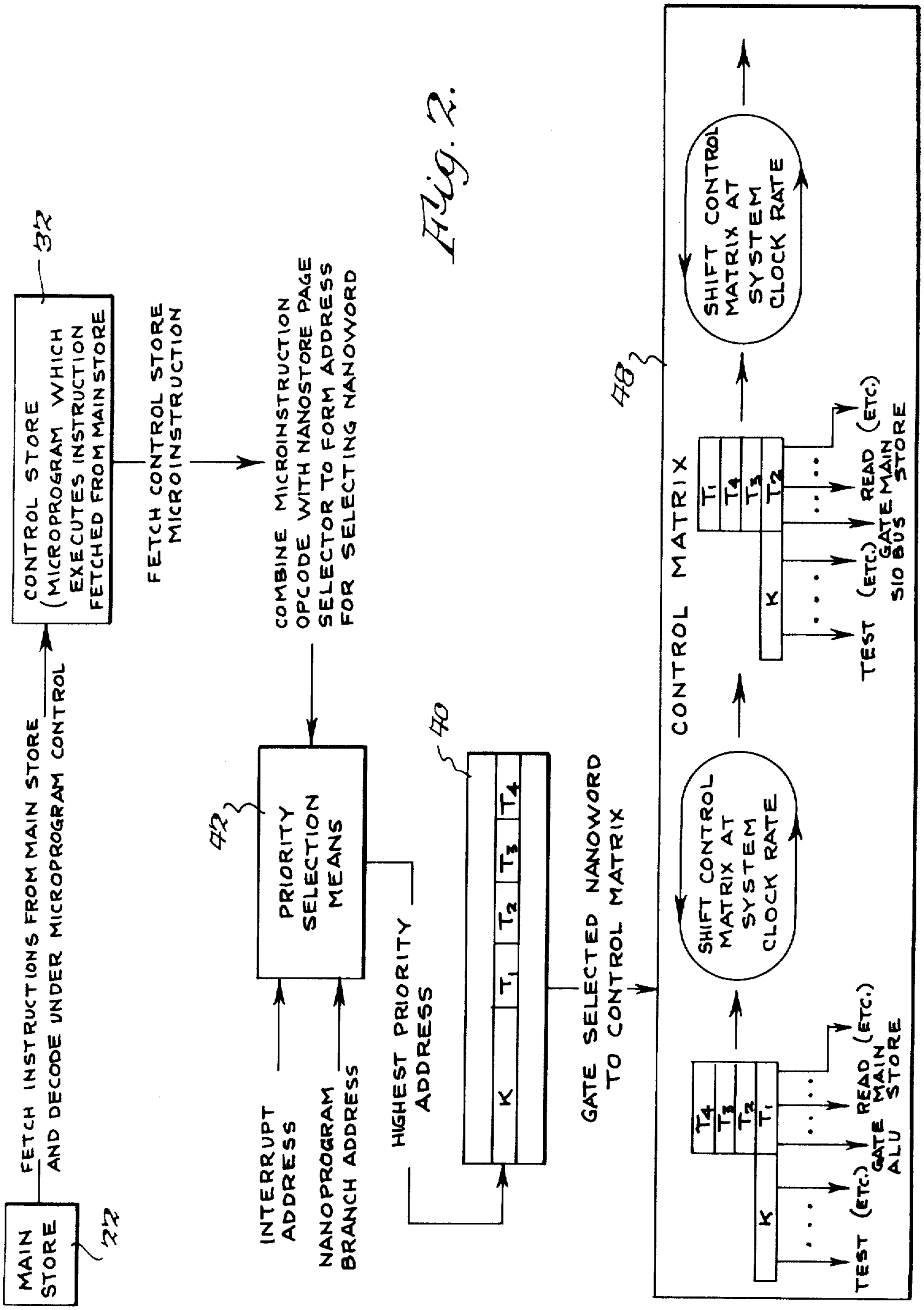
FIG. 2 is a diagrammatic illustration of the operation of a portion of the system of FIG. 1.

FIG. 2 briefly summarizes the operation of the data processing system of the present invention. A microinstruction is fetched from control store 32, and the opcode of the microinstruction is combined or concatenated with a three bit nanostage page address to form an address of a word to be selected from nanostore 40. This address is transmitted to a selection means 42 which, in turn, transmits the current address having the highest priority according to a scheme which will be described in detail presently. The highest priority address selects a word or instruction from nanostore 40, and the selected nanoinstruction to be executed is gated to control matrix 48. Then approximately 50 bits are split off into a register known as the K-vector, and the remaining bits are divided into four equal size fields or T-vectors which form four layers of bits in approximately 70 adjacent vertical shift registers of control matrix 48. With each system clock pulse, these registers are all shifted by one bit (circularly) inparallel. As a result, the current nanoinstruction or nanoword while it is in control matrix 48 is executed to control the system.

At any given clock interval or T period, the current T-vector concatenated with the K-vector forms the machine state vector from which basic gate-level control of the system hardware is obtained. Thus, the first machine state vector shown in FIG. 2 comprises the K-vector and the $T_1$ vector, which in turn include a plurality of nanofunctions such as test, gate ALU, read main store, etc. The next machine state vector illustrated in FIG. 2 after control matrix 48 has been shited once at the system clock rate comprises the same K-vector and the $T_2$ vector. The K-vector includes the same nanofunctions as the preceding K-vector, but the $T_2$ vector may have different nanofunctions, for example the gate SID bus function shown in FIG. 2. This process continues for as many T-vectors as are included in the nanoword, in the present illustration four, whereupon the next nanoword containing a different K-vector and different T-vectors is gated into control matrix 48. Thus, the K-vector portion of the nanoword or instruction has a duration equal to that of the instruction, and the T-vector portions are presented in a sequence, these portions having equal durations which in sum equal the duration of the instruction.

Accordingly, the four T-vectors of a nanoinstruction provide a sequence of controls for the system hardware at the basic or system clock rate, with the K-vector providing residual control through the complete nanoinstruction. The complete set or bit map of the K-and T-vectors with definitions of the individual bit functions, i.e. nanofunctions or nanoprimitives, serves to rigorously define the system hardware and will be described further on in the specification.

Interpretation of instructions becomes more flexible further up the system hierarchy. For example, although main store 22 is 18 bits wide in the present illustration, a main store machine instruction need not be 18 bits long, nor even a multiple of 18 bits, since main store accesses, including main store instruction fetching, are programmed at a lower level. In particular, as shown in FIG. 2, instructions fetched from main store 22 are under microprogram control. Control store 32 is relatively less flexible, although instruction fetching and data access, both fetch and store, are allowed in-line and out-of-line. This is because fetching of microinstructions out of control store 32 and their decoding are accomplished by hardware. In particular, the high-order 7 bits of a microinstruction in the 18 bit wide control store are constrained to be its opcode, since these bits are used by the hardware in generating an address in nanostore 40 at which to begin executing the nanoinstruction sequence (nanoprogram) which defines or interprets that microinstruction. Nanostore 40 is at the bottom of the system hierarchy, with each word of nanostore 40 being rigidly formatted for use in generating machine state vectors, and with fetching being a hardware function.

At the microprogram level, the system of the present invention achieves a useful compromise between horizontal and vertical microprogramming. Heretofore, the machine designer has had two basic choices for microinstruction layout: horizontal microstruction or vertical microinstruction. When executed, each bit in a horizontal microinstruction results in a control signal to a hardware component. When executed, the microopcode of a vertical microinstruction selects a relatively simple sequence of control signals. Horizontal microinstructions are preferable because they allow ultimate flexibility in control due to the fact that each signal or bit may be individually selected by the microprogrammer and because they allow parallel operation of hardware components. Vertical microinstructions, in contrast, provide a relatively limited selection of control patterns, with the number of possibilities depending upon the width of the micro-opcode. Horizontal microinstructions, on on the other hand, are more difficult to program and are much wider in number of bits so as to require costly storage. Lastly, horizontal microinstructions must be executed frequently, since they exercise each hardware component at the most once, whereas vertical microinstructions may specify a time-sequence of control signals, so they may be executed less frequently.

In the system of the present invention, the microinstructions in control store 32 are vertical, and the nanoinstructions in nanostore 40 are horizontal. Thus, machine instructions in main store 22 are executed by and defined by microprograms in control store 32, under vertical control. Microinstructions in control store 32 are executed by and defined by nanoprograms in nanostore 40 under horizontal control. As a result, the system of the present invention provides the full flexibility and parallelism of horizontal control, with the simplicity and economy of vertical control. In particular, the vertical format microinstructions include a 7 bit opcode with the remaining 11 bits used as either an immediate value or as a 5 bit operand and a 6 bit operand, with the option of using the next word or words to contain further operands. This provides programming convenience and economy of space. On the other hand, the flexibility of horizontal microprogramming is provided through a second level of emulation, with the ability to define, and dynamically redefine, microinstructions.

The manner in which the system of the present invention implements two-level emulation can be understood by considering the system control hierarchy with its parallel storage hierarchy. Emulation is the ability of one system to execute machine language programs written for another system. At the top of the hierarchy is main store 22 which typically contains the programs and data of the final emulated or virtual machine, and which corresponds to the main store of the conventional digital computer. Instrcutions in main store 22 are executed, interpreted, emulated and defined by sequences of microinstructions residing in the smaller, faster control store 32. Microinstructions in control store 32 are in turn executed, interpreted, emulated and defined by sequences of nanoinstructions residing in the still smaller nanostore 40. Finally, nanoinstructions are executed by hardware to achieve ultimate gate control of the machine.

Two-level emulation, however, is only one application of the system of the present invention. From a different point of view, the system may be regarded as a very fast general purpose computer having programs which run in a store that happens to be designated as a control store. These programs then have available to them a secondary storage unit designated as a main store, which may contain message buffers, program overlays, etc. This concept becomes clearer when one considers that in any emulation, the contents of the program store of the target machine as viewed merely as data by the emulator program, which happens to interpret that data.

The system of the present invention allows the user to define his own instruction set and architecture, and to do so dynamically if desired. This is provided by dynamically writeable control memories in the form of control store 32 and nanostore 40 at both levels of control in the system, and by virtue of nanostore 40 and control matrix 48 wherein dynamic sequencing of nanofunction occurs. The instructions defined by the user may themselves be executed as microinstructions in a fast control store 32 which, in turn, serves to define higher level instructions in a traditional main store 22. Alternatively, the instructions defined by nanoprogramming may be used as the primary machine instructions, with the store in which they reside used as the main store. This option provides user-defined, and dynamically redefinable, instructions executing at speeds up to approximately 240 nanoseconds.

The system of the present invention thus provides programmed control of gate level functions, operating at the basic clock rate of the system. It includes a large number of data paths to allow parallel operations, and all registers of interest are readily accessible to the programmer. In particular, the various buses not only transmit data independently of each other, but the buses also are independently connectable to the registers of local store 20. In other words, the registers of local store are not dedicated to specific predefined functions, but rather all possible data paths to and from the system components may be connected by the nanoprogrammer at any time to any of these registers. The data paths, registers and memories are of uniform width which in the present instance is 18 bits, the control memories at both levels of emulation are dynamically writable, and the system includes synchronous logic to enhance parallelism. The microinstructions of control store 32 and the nanoinstructions of nanostore 40 together provide flexible combinations of instantaneous and residual control.

Nanofunctions And Control Matrix

A nanoword or nanoinstruction currently selected from nano storage means 40 is transferred through path 46, which contains a plurality of lines equal to the number of bit positions in each nanoword, to control matrix 48 wherein it is stored in the form of a constant field and a plurality of time dependent fields, in the present illustration four. Both individual bits and groups of bits in the current nanoword provide corresponding nanofunctions for controlling the system. Where a field or nanofunction contains only one bit, the presence or absence thereof can be a direct control input to system circuitry or hardware, whereas when a field or nanofunction includes a group of bits they usually first are applied as inputs to a decoder. Table I shows a bit map for a nanoword or nanoinstruction according to the present invention.

TABLE I

| Field of K-Vector | Name of Nanofunction | Number of bits | Description |
|---|---|---|---|
| K0 | PREP BRANCH | 1 | Prepare To Branch |
| K1 | NS PROTECT | 1 | Nanostore Protection |
| K2 | FILL STATUS | 1 | Arithmetic Condition |
| K3 | INT ALLOW | 1 | Allow Interrupt |
| K4 | KIO | 1 | Input-Output Control |
| K5 | KN | 10 | Branch Address |
| K6 | KA | 6 | Constant |
| K7 | KB | 6 | Constant |
| K8 | KALC | 6 | ALU Function Control |
| K9 | KSHC | 6 | Shifter Function Control |
| K10 | SH COMMAND | 6 | Shifter Control |
| K11 | | 15 | Spares |
| T-Vector (4 per instruction) | | | |
| T0 | STRETCH | 1 | Expand T Period |
| T1 | INC MPC | 1 | Control Store Addressing |
| T2 | DEC LIV | 1 | Decrement Cycle Counter |
| T3 | GATE MS | 1 | Operate MOD Bus |
| T4 | GATE ALU | 1 | Operate AOD Bus |
| T5 | GATE SH | 1 | Operate SOD Bus |
| T6 | GATE CS | 1 | Operate COD Bus |
| T7 | GATE ER | 1 | Operate EOD Bus |
| T8 | WRITE MS | 1 | Operate MIX Bus |
| T9 | WRITE CS | 1 | Operate CID Bus |
| T10 | WRITE ER | 1 | Operate EID Bus |
| T11 | RESET IO | 1 | Input-Output Control |
| T12 | XMIT IO | 1 | Input-Output Control |
| T13 | *fx* | 5 | F Transfer Control |
| T14 | *fy* | 5 | F Transfer Control |
| T15 | *fz* | 5 | F Transfer Control |
| T16 | *sdx* | 3 | F Transfer COntrol |
| T17 | *sdy* | 3 | F Transfer Control |
| T18 | *sdz* | 3 | F Transfer Control |
| T19–T24 | XFER | 6 | F Transfer Commands |
| T25 | TEST-SKIP | 5 | Test And Conditional Skip |
| T26 | CS ADDRESS | 3 | Control Store Addressing |
| T27 | FILL MPB | 1 | Nanostore Addressing |
| T28 | AUX SEL | 4 | Fast Increment |
| T29 | INC SEL | 2 | Fast Increment |
| T30 | READ NS | 1 | Read Nanostore |
| T31 | GATE NS | 1 | Gate Nanostore |
| T32 | WRITE NS | 1 | Write Nanostore |
| T33 | FILL ALU | 1 | ALU Control |
| T34 | SET CARRY | 1 | ALU Control |
| T35 | RESET CARRY | 1 | ALU Control |
| T36 | READ CS | 1 | Read Control Store |
| T37 | Read MS | 1 | Read Main Store |
| T38 | INC MPC SOURCE SEL | 2 | Microprogram Incrementing |
| T39 | INC MPC | 1 | Microprogram Incrementing |
| T40 | | 6 | Spares |

According to a preferred mode of the present invention, the K-vector includes up to 60 bit positions and each T-vector has up to 75 bit positions. Each machine state vector, which includes the K-vector and the current T-vector, is up to 135 bits wide. Accordingly, control matrix 48 in the present illustration is wide enough to accommodate 135 bit positions. Nanostore 40, however, must be 360 bits wide according to this preferred mode because each nanoword or nanoinstruction contains a K-vector and four T-vectors. It is to be understood that the foregoing description and nanoinstruction bit map of Table I are intended to be illustrative of a preferred mode and that the number of bit positions in the K-and T-vectors and in the entire nanoword, as well as the nature of the nanofunctions themselves, can be changed to accommodate various programming requirements without departing from the spirit and scope of the present invention. The manner in which the nanofunctions are used to control the system according to the present invention will be clearly apparent when the various system components are described in further detail presently.

Figures 3, 4:
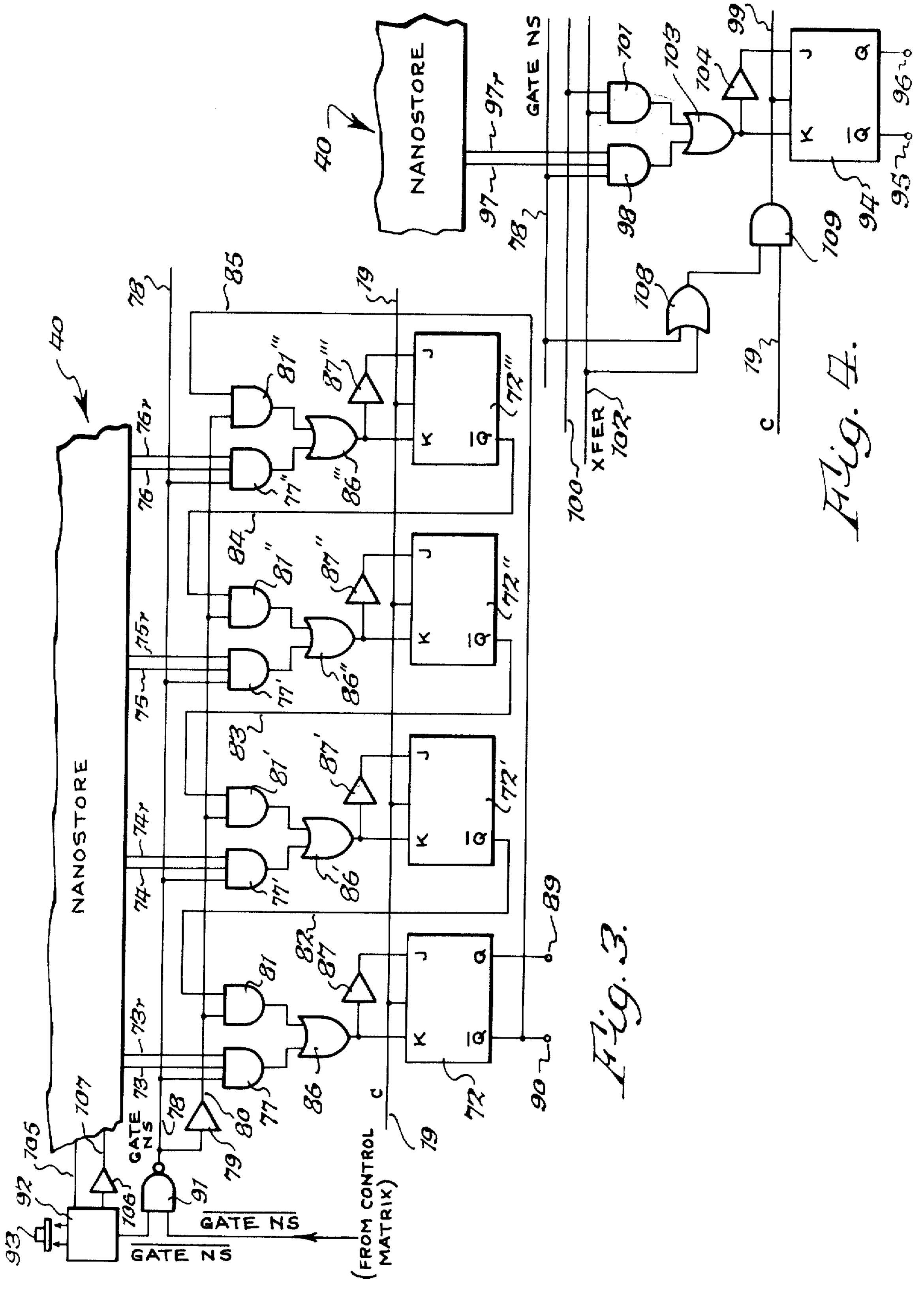
FIG. 3 is a logic diagram of one portion of the control matrix in the system of FIG. 1.
FIG. 4 is a logic diagram of another portion of the control matrix in the system of FIG. 1.

FIG. 3 illustrates a circuit forming a single bit in the T-vector or time-dependent field portion of control matrix 48. Each circuit includes a plurality of identical J-K flip-flops, and in the present illustration there are four flip-flops 72, 72′, 72″ and 72‴ corresponding to the four time intervals of the T field sequence, i.e. the T-vectors $T_1$–$T_4$. Lines 73–76 connect connect bit positions in nanostorage means 40 to inputs of AND gates 77, 77′, 77″ and 77‴ associated with the flip-flops 72–72‴. Lines **73*r*–76*r* connect bit positions of a read-only portion of nanostore 40 to inputs of gates 77–77‴ for initial starting of the system and other purposes. A line 78 connects a GATE NS nanofunction to the other inputs of AND gates 77–77‴. Line 78, in turn, is connected to the output of a gate 91, and one input to gate 91 is the nanofunction $\overline{\text{GATE NS}}$ obtained from the current nanoword. Another input to gate 91 is $\overline{\text{GATE NS}}$ generated by a system starting means 92, manually operated by a button 93 and connected to gate 91. A line 105 connects a signal generated by means 92 to the read-only portion of nanostore 40 for gating that portion when the system is initially started. Thereafter, the absence of a start command is inverted by an inverter 106 and applied by a line 107 to enable gating of the selected words in the other portion of nanostore 40. The signal on line 78 is inverted by an inverter 79 and applied by a line 80 to the inputs of another set of AND gates 81, 81', 81'' and 81''' corresponding to the flip-flops 72–72''', respectively. The other inputs to the AND gates 81–81''' are connected to the complement output value of the neighboring or adjacent flip-flop. In particular, the other input to AND gate 81 is connected by a line 82 to the output of flip-flop 72', the input to gate 81' is connected through a line 83 to the output of flip-flop 72'', and the input to gate 81'' is connected through a line 84 to the output of flip-flop 72'''. The input to gate 81''' is connected by a line 85 to the output of flip-flop 72. The outputs of AND gates 77–77''' and of AND gates 81–81''' are connected to the inputs of corresponding OR gates 86, 86', 86'' and 86''', the outputs of which are connected to the K input of flip-flops 72,72',72'' and 72''', respectively. The outputs of OR gates 86–86''' are connected also through inverters 87,87',87'' and 87''', respectively, to the J inputs of the corresponding flip-flops 72–72'''. Pulses from the system clock 18 are applied to each of the flip-flops 72-72''' by line 19. At each of the periods $T_1$–$T_4$ either of the values on lines 89,90 can be used depending upon whether the true or complement value is desired. The circuit of FIG. 3 is provided for each bit position in the T-vector portion of control matrix 48, and according to the foregoing example up to 75 circuits identical to that of FIG. 3 are provided. Lines 73–76 shown in FIG. 3 are among the plurality of lines collectively designated 46 in FIG. 1.**

The circuit of FIG. 3 operates in the following manner. The J-K flip-flops 72–72''' use the input conditions K=1,K=0 and J=0, K=1 and do not use the conditions K=K=0 and J=K=1. Assume for purposes of illustration that the single bit position in control matrix 48 provided by the circuit of FIG. 3 is a one bit nanofunction such as WRITE MS shown in Table I at field $T_8$. Assume further that the nanofunction WRITE MS to be present only at time $T_4$ of the current nanoword. Therefore, the WRITE MS function for this particular nanoword is stored horizontally in nanostore in the form 0001, and when this nanoword has been selected or addressed for gating to control matrix 48, lines 73–75 have signals corresponding to binary zero and line 76 has a single corresponding to binary 1. Accordingly, one input of each of the AND gates 77,77' and 77'' is a logical zero and one input of AND gate 77''' is a logical one.

When the current nanoword is to be gated to control matrix 48, a GATE NS signal from the previous nanoword is present on line 78 which results in application of logical one to the other inputs of each of the AND gates 77–77'''. Simultaneously, inverter 79 and connect bit positions in nanostorage means 40 to inputs of AND gates 77, 77', 77'' and 77''' associated with the flip-flops 72–72'''. A line 78 connects a loading or gating function to the other inputs of AND gates 77–77'''. The signal on line 78 is inverted by an inverter 79 and applied by a line 80 to the inputs of another set of AND gates 81, 81', 81'' and 81''' corresponding to the flip-flops 72–72''', respectively. The other inputs to the AND gates 81–81''' are connected to the complement output value of the neighboring or adjacent flip-flop. In particular, the other input to AND gate 81 is connected by a line 82 to the output of flip-flop 72', the input to gate 81' is connected through a line 83 to the output of flip-flop 72'', and the input to gate 81'' is connected to a line 84 to the output of flip-flop 72'''. The input to gate 81''' is connected by a line 85 to the output of flip-flop 72. The outputs of AND gates 77–77''' and of AND gates 81–81''' are connected to the inputs of corresponding OR gates 86, 86', 86'' and 86''', the outputs of which are connected to the K input of flip-flops 72, 72', 72'' and 72''', respectively. The outputs of OR gates 86–86''' are connected also through inverters 87, 87', 87'' and 87''', respectively, to the J inputs of the corresponding flip-flops 72–72'''. Pulses from the system clock 18 are applied to each of the flip-flops 72–72''' by line 19. At each of the periods $T_1$–$T_4$ either of the values on lines 89, 90 can be used depending upon whether 72' are applied by lines 83 and 82 to inputs of AND gates 81' and 81, respectively, of flip-flops 72' and 72. Line 85 applies the output of flip-flop 72 to AND gate 81''' of flip-flop 72''' for repeating the sequence if a new nanoword is not gated after the steps corresponding to intervals $T_1$–$T_4$.

The GATE NS nanofunction has terminated and the logical zero on line 78 disables AND gates 77–77''', but inverter 79 and line 80 provide a logical one to enable AND gates 81. As a result, the flip-flops have the following input states: flip-flop 72 has K=0,J=1, flip-flop 72' has K=0–J=1, flip-flop 72'' has K=1, J=0 and flip-flop 72''' has K=0,J=1. Then, the next system clock pulse $T_2$ appears on line 19, the trailing edge of the pulse triggers the flip-flops 72-72''' simultaneously whereby the states or outputs of flip-flops 72 and 72' are logical zero, the output of flip-flop 72'' is a logical one, and the output of flip-flop 72''' is logical zero. Thus, the state or output of flip-flop 72 at this $T_2$ interval is zero which is the desired state of the nanofunction at $T_2$ according to the foregoing discussion.

By proceeding through a similar analysis, it should be apparent that at the time corresponding to the trailing edge of clock pulse $T_3$ the states of flip-flops 72-72''' are 0,1, 0 and 0 respectively, and at the trailing edge of pulse $T_4$ the states of flip-flops 72–72''' are 1,0,0 and 0 respectively. Furthermore, if a GATE NS nanofunction does not appear on line 78 after trailing edge of pulse $T_4$, the foregoing sequence will be repeated because of the connection of the output of flip-flop 72 through line 85 to AND gate 81'''. A preferred source of the GATE NS signal is a $T_4$ nanofunction of the previous nanoword, although the function could be generated by a separate source synchronized with system clock 18. Lines 19 and 78 shown in FIG. 3 are similarly connected to all the circuits included in the T-vector portion of control matrix 48.

FIG. 4 illustrates a circuit for a bit of the constant or K field portion of control matrix 48. A J-K flip-flop 94 is included for each bit, and the true and complement outputs are available on leads 95,96. A line 97 connects a bit position in nanostorage means 40 to one input of an AND gate 98, the other input of which is connected to line 78 on which the nanofunction GATE NS is available. Line 97r connects a bit position of the read-only portion of nanostore 40 to gate 98 for the same reason as in the circuit of FIG. 3. The circuit of FIG. 4 is exemplary of one of the bit positions of control matrix 48 which supply values to, or receive values from, the F registers such as one of the six bit positions of function KA in field K6. This transfer with the F registers will be described further on in the specification. Bit positions of selected F registers are connected by a line 100 to one input of an AND gate 101, and the other input of gate 101 is connected by a line 102 which applies the XFER nanofunction which must be present when it is desired to return the contents of a particular R register to the K field of control matrix 48. In particular, the XFER nanofunction of line 102 comes from one of the T fields T19–T24 as shown in Table I depending upon which K field it is desired to make the transfer to. The outputs of AND gates 98 and 101 are connected to inputs of an OR gate 103, the output of which is connected to the K input of flip-flop 95. The output of OR gate 103 also is connected through an inverter 104 to the K input of flip-flop 94. The foregoing circuit is included for each of the bits forming the K fields K6–K10 of control matrix 48, and the bits forming the remaining K fields can comprise the circuit of FIG. 4 without the components for making connection to bit positions of selected F registers. Line 78 is connected to each circuit forming a bit of the K field of control matrix 48, and lines 100, 102 need be connected only to the circuits forming bits of the fields K6–K10. lines 78 and 102 are also connected to inputs of an OR gate 108, the output of which is ANDed with system clock pulses on line 19 by a gate 109. A trigger pulse for the flip-flops, such as 94, is present on line 99.

The circuit of FIG. 4 operates in the following manner. In response to the presence of the GATE NS signal of line 78, a logical one is applied to one input of AND gate 98 and a system clock pulse is present on line 99. The corresponding bit position of the K-vector field of the current selected nanoword from nanostore 40 is connected by line 97 to the other input of AND gate 98. Depending upon whether the particular bit is a zero or one, a logical zero or one is applied to AND gate 98, the logical output of which is applied through OR gate 103 to the K input of flip-flop 94. At the time of the trailing edge of the clock pulse, the state of flip-flop 94 becomes the same as that of the bit position of nanostore 40, and the true and complement values of the output state of flip-flop 94 are available on lines 95,96.

If nothing else happens during the current nanoword, the state of flip-flop 94, and hence the value of the bit in this position of the K-vector field of control matrix 48, remains the same during the intervals $T_1$–$T_4$ until the next nanoword is to be gated from nanostore 40 as commanded by the GATE NS nanofunction on line 78. On the other hand, during one of the intervals of the current nanoword, for example $T_3$, it may be desired to transfer the value in a selected F register to one of the fields of the K-vector such as field KA. A bit position of the selected F register is connected by line 100 to one input of AND gate 101, and the XFER nanofunction is present on line 102 to apply a logical one to the other input of AND gate 101, the output of which is applied by OR gate 103 to the K input of flip-flop 74. The presence of XFER on line 102 also allows a clock pulse to appear on line 99. Thus, at the time of the trailing edge of the clock pulse the state of flip-flop 94 becomes the same as that of the bit position in the F register, and the output of flip-flop 94 is available on lines 95,96.

The part of control matrix 48 corresponding to the K-field portion of the current nanoword thus comprises a single register containing a number of flip-flops, such as flip-flop 94 in FIG. 4, equal to the number of bit positions in the K field portion which in the present example is up to 60 bit positions. The part of control matrix 48 corresponding to the T-field portion of the nanoword comprises a shift register or circulating register, such as the register provided by flip-flops 72,72', 72'' and 72''' of FIG. 3, for each bit portion which in the present example is up to 75 bit positions.

Local Store and F Registers

The registers contained in local storage means 20 comprise the working registers for the data processing system and are designated R registers. A majority of the R registers have no dedicated purpose, and they can be used as the programmer desires. A smaller number of the R registers, in the present illustration eight, have the capability of being incremented directly by a primitive nanofunction without reference to arithmetic and logical unit 24. These fast increment registers can effect 18 bit additions in one clock period. For this reason the microprogram address normally will occupy one of these eight fast increment registers. Another R register is a micro-instruction register and includes three fields defined as follows: a seven bit operation code field designated OP, a six bit operand field designated A and a five bit operand field designated B. All registers of local storage means 20 are 18 bits wide, are readable and writeable within one clock period, and all register transfers are synchronous which allows any register to be both read and written simultaneously in the same T-period or clock period without loss of data.

Some of the F registers in the group designated 54 in FIG. 1 are associated with the buses connected to local storage means 20, and these registers are supplied with the information required to connect the particular bus each register is associated with to a specific R register in local storage means 20. In accordance with this invention, values placed in the F registers are supplied from within the nanoprogram, i.e., the sequence of machine state vectors, and not externally.

TABLE II

| F Register Name | Function |
|---|---|
| FSOD | Shifter Output (Read) Bus Attachment |
| FAOD | ALU Output (Read) Bus Attachment |
| FMOD | Main Store Output (Read) Bus Attachment |
| FEOD | External Output (Read) Bus Attachment |
| FCOD | Cont. Store Output (Read) Bus Attachment |
| FEOA | External Output Bus Address |
| FCID | Con. Store Input (Write) Bus Attachment |
| FEID | External Input (Write) Bus Attachment |
| FEIA | External Input Bus Address |
| FMIX | Main Store Input (Write) Bus Attachment |
| FAIL | ALU Left Input (Write) Bus Attachment |
| FAIR | ALU Right Input (Write) Bus Attachment |
| FSID | Shifter Input (Write) Bus Attachment |
| FDIX | Nanostore Page Address |
| FLIV | Cycle Counter |
| FIST | Conditions and Testing |
| FINV | General Use |
| FINR | General Use |
| FIPH | Transfers And Source Of Zeros |
| FISA | General Use |
| FMPC | Control Store Addressing |

The foregoing is illustrated in further detail by observing that bus 7, also designated SID in FIG. 1, is permanently connected at one end to the input of shifter 28. The arrow points in the direction of data flow. The meaning or definition of the line connecting bus 7 to local storage means 20 is that at any given time bus 7 is connected to the particular R register in local storage means 20 specified by the value in the F register designated FSID in Table II which is the F register associated with bus 7. In this connection it is important to note that the F registers are six bits wide. Among the several sources for values to be placed in the F registers are the A and B fields of the microinstruction and portions of the constant field in the current nanoword. The manner in which the F registers of group 54 connect the various buses to selected ones of the R registers in local store 20 will be described in detail presently.

Data transmission on the various buses of the system is controlled by certain nanofunctions from control matrix 48 such as Gate Control Store, Write External Store, Load Shifter, etc. Specification of which registers of local store 20 the buses connect with is accomplished by a program-accessible F-register associated with each bus. Thus placing the six bit binary equivalent of the number 14 in F registers FCOD specifies that data will be gated out of control store 32 through bus 10 into register number 14 of local store 20 when the GATE CS nanofunction is transmitted through control line 50 to bus 10 and executed.

The system of the present invention provides special routes between main store 22 and external store 65 to facilitate input-output programming. When F registers FMOD and FMIX are provided with values greater than 31, i.e., when the high order bit is 1, these registers then address the channel registers of external store 65, using the low five bits of the F register, rather than addressing registers of local store 20.

Thus, the various buses not only transmit data independently of each other, but they are also independently connectable to the registers of local storage means 20. Several buses may be exercised at once, carrying data into and out of different registers of local store 20, or the same register, to achieve parallel programmable operations.

Referring again to Table II, the F registers FSOD through FSID are associated with the buses connected to local storage means 20, and are used to residual register-addressing control and bus control. Register FIDX contains a page address for nanostore 40 and will be described in further detail presently. FLIV is a cycle counter, which after being loaded with a value, can be decremented by one by a nanofunction DEC LIV, and then tested for zero/non-zero status for conditioned nanofunction execution as will be described presently. FIST is associated with conditions and testing which will be described further on in the specification. F registers FINV and FINR are available for general use such as indicating whether a negation was made in a multiplication program which will be illustrated presently.

F register FIPH is used to facilitate six bit data transfers and serves as a permanent source of a six bit zero for general programming use. FISA is one of a plurality of F registers included for general programming use. F register FMPC is used in conjunction with control store addressing means 34 in a manner which will be described. The arrangement of the present invention for placing values in the F registers and changing the contents of the F registers now will be described.

Figures 5, 6B:
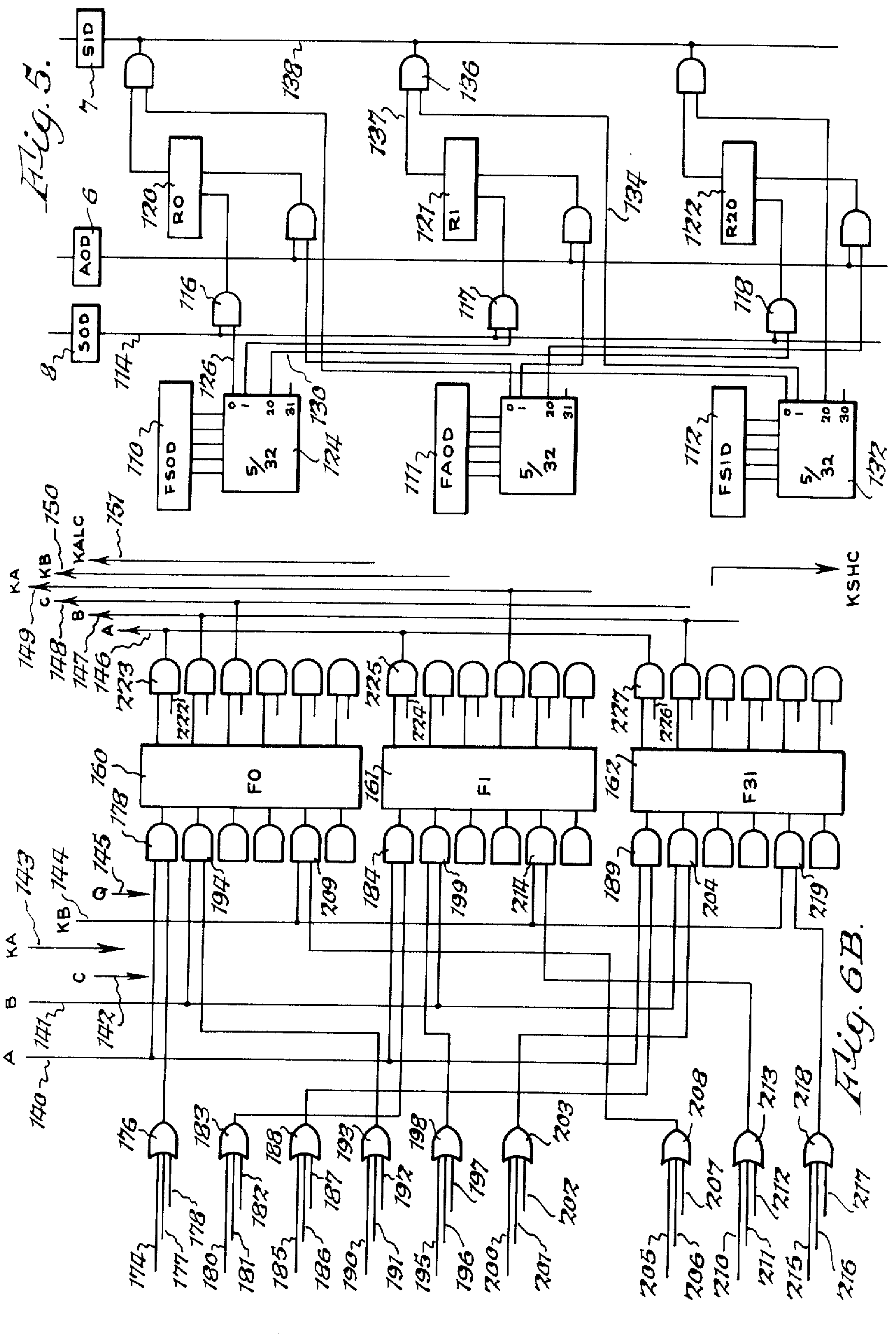
FIG. 5 is a logic diagram of an arrangement for selecting registers in the local store of the system of FIG. 1.

FIG. 5 illustrates the manner in which the F registers of group 54 connect the various buses to selected ones of the R registers in local storage means 20. In the present illustration buses SOD, AOD and SID are shown and the F registers associated with these buses are indicated at 110, 111 and 112, respectively. Each bus is connected to a particular one of the R registers as determined by the low order five bits of the six bit number contained in the F register associated with that bus. In particular, bus 8 or SOD is connected by a line 114 to one input of each of a plurality of AND gates, for example gates 116-118, there being at least one such AND gate for each R register in local storage means 20. If connection of bus 8 to the R register designated 120 in FIG. 1 is desired, the low order five bits of the number placed in F register 110 might have the value zero. Each of the five bits in F register 110 are applied as inputs to a 5/32 decoder designated 124. Decoder 124 produces one of 32 discrete outputs depending upon the value of the five bit input. In the foregoing example, therefore, the 0 output terminal of decoder 125 is provided with a signal which is conducted by a line 126 to the other input of AND gate 116. As a result, AND gate 116 is enabled to transmit the information from bus 8 to R register 120. Similarly, to connect bus 8 to R register 122, the low order five bits of the six bit number placed in F register 110 would have the value 20 and be decoded to provide a signal on terminal 20 of decoder 124, and the signal is conducted by a line 130 to the other input of AND gate 118 thereby allowing the gate to transmit the information on line 114 to R register 122. By following a similar analysis, it is apparent that bus 6 is connected to a particular one of the R registers as determined by the five bit number placed in F register III.

The circuit of FIG. 5 has the capability of transferring the contents of the R registers in storage means 20 to particular buses, and selection of a particular R register to be connected to a bus is determined by the contents of the F register associated with the bus. For example, assume that is is desired to transfer the contents of R register 121 to SID bus 7. F register 112 is associated with bus 7, and the five bit value placed in F register 112 is that corresponding to the number of R register 121, which is one. Decoder 132 provides an output signal on terminal 1 which is connected by a line 134 to one input of an AND gate 136, the other input of which is connected by a line 137 to R register 121. As a result AND gate 136 is enabled thereby allowing transmission of the contents of R register 121 through line 138 to bus 13. The arrangement of FIG. 5 includes a plurality of AND gates like gate 136 for each of the buses, and there is at least one gate for the output of each R register. Each bus which connects to the outputs of R registers has an F register associated therewith in which the number of selected R register is placed therein, and the output of each F register is connected to a decoder which, in turn, is connected to the AND gates.

The foregoing description is somewhat abbreviated in that paths between buses and R registers are represented by single lines, whereas the paths actually comprise a plurality of lines equal to the number of bit positions in each R register which in the present illustration is 18. Thus there would be eighteen lines like line 114 from bus 8, and they would be connected to 18 corresponding AND gates like gate 116. Line 126 would be connected to each gate. The 18 outputs of these gates would be connected to the 18 bit positions of R register 120. Similarly, 18 lines like line 137 would connect the 18 bit positions of R register 121 to eighteen corresponding AND gates like gate 136, each gate being connected also to line 134, and the eighteen outputs of these gates would be connected by lines like line 138 to bus 7. These arrangements would be provided for all the buses and R registers.

Figure 6A:
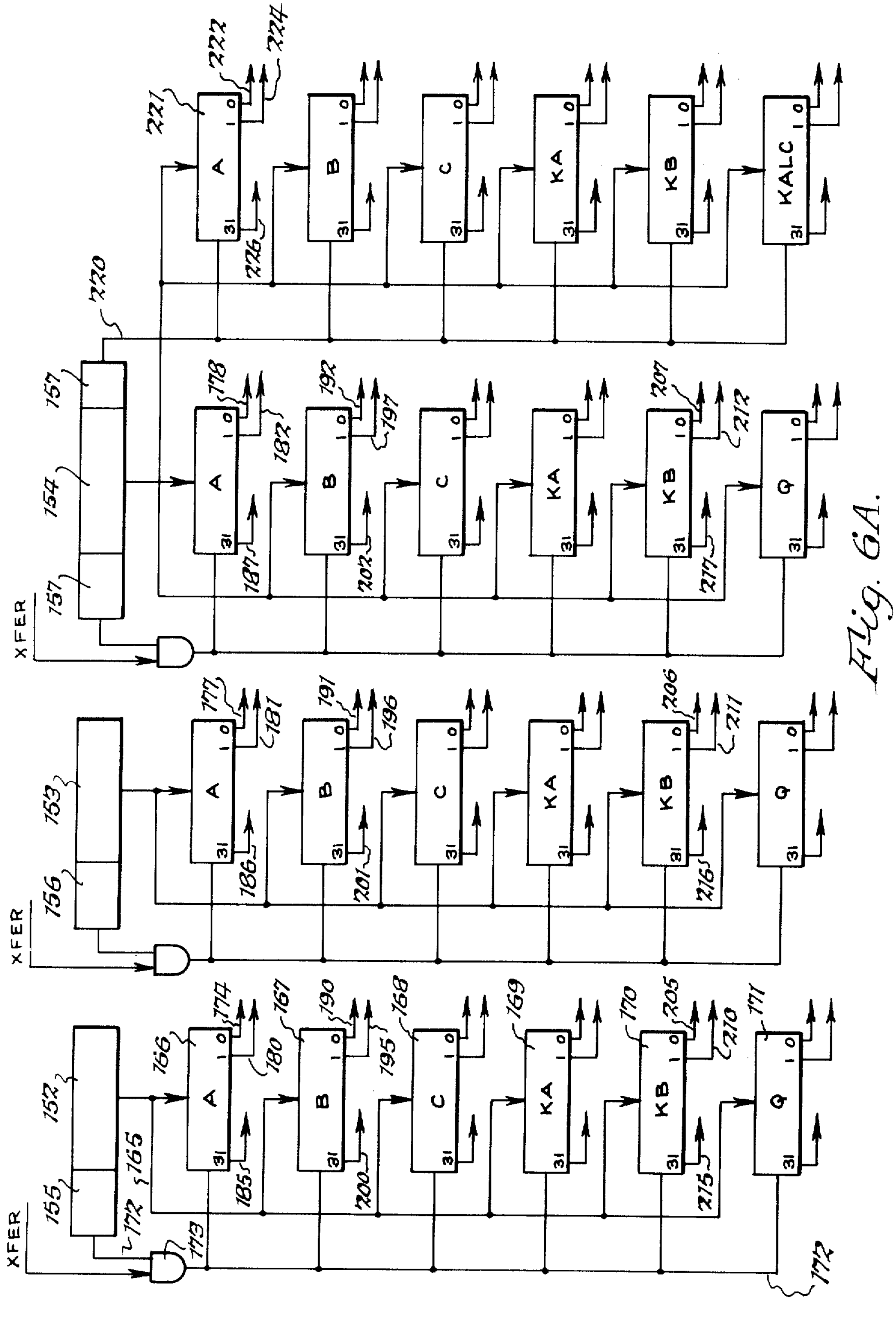
FIG. 6 is a logic diagram of an arrangement for transferring quantities to and from certain registers in the system of FIG. 1.

FIG. 6 illustrates an arrangement according to the present invention for changing the contents of the F registers. There are several sources for the six bit values to be placed in the F registers: The A, B and C fields of the microinstruction, two nanofunctions KA and KB of the constant field or K-vector of the of the current nanoword, and any of the fields designated Q. B represents the low-order six bits of the current microinstruction, A represents the central six bits thereof, and C represents the high-order six bits thereof. Q represents auxiliary fields contained in auxiliary registers of external storage means 65 or in auxiliary T fields of nanowords. Lines 140–145 represent paths from the sources of the values A, B, C, KA, KB, and Q, respectively, to the system of FIG. 6. Similarly, lines 146–151 indicate paths from the system of FIG. 6 to various destinations, some of which are the foregoing sources. In particular, the quantities A, B and C are stored in the microinstruction register of local storage means 20 so that the paths represented by lines 140–142 and 146–148 are connected to the outputs and inputs, respectively, the microinstruction register. The quantities KA and KB are available from the K-vector portion of control matrix 48 so the paths represented by lines 143, 144 and 149, 150 are connected to the outputs and inputs, respectively, of the circuits providing K-vector bit positions of control matrix 48, such as the circuit of FIG. 4. The path represented by lines 145 is connected to registers in external storage means 65 or to bit positions in the T-vector portion of control matrix 48, depending upon the source of Q. A path exists from the F registers to the bit positions of the K-vector field of control matrix 48 corresponding to the nanofunction KALC, the path being represented by the line 151. As a result, values can be transferred from selected F registers to control matrix 48 to provide values for the nanofunction KALC which, in turn, controls the operations performed by arithmetic and logical unit 24. Similar paths are provided from the F registers to the K-vector fields of control matrix 48 for the nanofunction KSHC, which controls shifter 28, and for the nanofunction KS which is a spare for conditional operations.

The nanofunctions *fx*, *fy* and *fz* in the T-vector fields T13–T15 of the current nanoword individually contain the information determining or selecting a particular F register which is to be provided with one of the values A,B,C, $K_A$, $K_B$ and Q. As a result, three F registers can be designated simultaneously. For convenience in description the bit positions of control matrix 48 in the fields T13, T14 and T15 are designated 152, 153 and 154, respectively, in FIG. 6 where each of the blocks 152, 153 and 154 represents five bits of a current nanoword. Each of the five bit fields when decoded gives a number from 0 to 31 for selecting a particular one of the F registers. The nanofunctions *sdx*, *sdy* and *sdz* in the T-vector fields T16–T18 of the current nanoword each contain the information determining which of the values A, B, C, KA, KB or Q on lines 140–145, respectively, will be transferred to the selected F register. For convenience in description the bit positions of control matrix 48 in the fields T16, T17 and T18 are designated 155, 156 and 157, respectively, where each of the blocks 155, 156 and 157 represent three bits of a current nanoword. Each of the three bit fields when decoded selects one of six decoder circuits corresponding to the values A, B, C, KA, KB, or Q. As shown in FIG. 6, block 157 is used twice in conjunction with block 154 representing nanofunction *fz* for selecting a destination when transfer is from a selected F register to one of the destinations A,B,C,KA,KB,KALC, KSHC, or KS as will be described presently. Transfer from sources to F registers is under control of three bits of the nanofunction XFER in fields T19–T21, and transfer from F registers to destinations is under control of the remaining three bits in fields T22–T24 of XFER.

Assume, for example, that it is desired to place the value A present in the path represented by line 140 into the F register indicated at 160 in FIG. 6. The number corresponding to register 160 in this illustration is zero and would be contained in the five bit field 152. The information that quantity A is to be transferred is in the three bit field 155. Alternatively, this same information could be contained in either of the fields 153, 156 and 154, 157. The five bit value is transferred through a path 165 simultaneously to each of six 5/32 decoders 166–171. The three bit value in field 155 is transferred under control of nanofunction XFER through path 172 and AND gate 173 and serves to enable only one of the decoders which in the present example is decoder 166 corresponding to value A. In particular, path 172 would include three lines, one for each bit, and a gate 173 woudl be connected in each line. XFER is a one bit quantity, for example the bit present in T-vector field T19, and would be applied to all three AND gates. Decoder 166 transforms the five bit input into a descrete logical one output which is available on the terminal numbered zero. This is conducted by a line 174 to an OR gate 176. The other two inputs to OR gate 176, i.e., those indicated 177 and 178, are connected to the number zero output terminals of corresponding decoders which receive information from fields 153 and 154 as shown in FIG. 6. Thus, when a logical one input signal from any of the lines 174, 177 or 178 is applied to or gate 176, a logical one signal is transmitted by gate 176 and applied as one input to an AND gate 178 connected to the input of F register 160. The other input to AND gate 178 is connected to line 140 with the result that the quantity A is placed in the F register designated 160.

By way of further illustration, if it is desired to transfer the quantity A to F register 161 the corresponding five bit quantity contained in any of the fields 152–154 is transferred to the appropriate decoder such as decoder 166 resulting in a signal on output terminal number 1 whilch is conducted by one of the lines 180–182 causing OR gate 183 to transmit a signal to enable AND gate 184 associated with register 161 whereby the quantity A present on line 140 is placed in F register 161. If it is desired to transfer the quantity B on line 141 to F register 160, then any of the fields 152–154 are provided with the appropriate five bit quantity to select register 160, and the appropriate one of the fields 155–157 contains the value which will select the decoders corresponding to B. The nanofunction XFER is present to enable selection of a particular B decoder. A signal is present on the number 0 output terminal of the selected decoder and is conducted by one of the lines 190–192 causing OR gate 193 to apply a signal to enable AND gate 194 whereby the quantity B present on line 141 is placed in F register 160. By proceeding through a similar analysis it is apparent that AND gate 199 associated with F register 161 is enabled by the presence of a signal on any of the lines 195–197 applied to OR gate 198 for transferrring value B to F register 161.

The arrangement of FIG. 6 also has the capability of transferring the contents of a selected F register to various destinations such as back to the sources of the values A, B, C, KA and KB or to the K-vector fields KALC, KSHC and KS. The information selecting the particular F register is placed in the five bit field 154. The three bit quantity placed in field 157 selects one of a plurality of decoders, there being one decoder for each of the destinations, and the bits are transmitted by a path to all of the decoders, one being labeled 221 in FIG. 6. In the present example, the eight possible combinations of the three bit quantity in field 157 are used to select among the eight possible destinations listed above. By way of example, if it is desired to transfer the contents of F register 160 through path 146 back to the source of value A, the three bit value transmitted by path 220 enables decoder 221, and the five bit quantity from field 154 is converted by decoder 221 to a signal appearing on terminal number zero which is conducted by a line 222 to AND gate 223 connected to the output of register 160. As a result, AND gate 223 is enabled thereby allowing transfer of the contents of register 160 through path 146 to the source of quantity A. Likewise, the same transfer would occur from F register 161 when the value applied to decoder 221 results in a signal on the number 1 terminal thereof which is transmitted through a line 224 to enable AND gate 225.

The foregoing description is somewhat abbreviated in that paths between the sources of the quantities such as A,B,C,KA, KB and Q and the F registers are represented by single lines, whereas the paths actually comprise a plurality of lines equal to the number of bit positions in each F register which in the present illustration is five. Thus there would be five lines like line 140 from the five bit positions in the register of local store 2o containing quantity A, and they would be connected to five corresponding AND gates like gate 178. The output of OR gate 176 would be connected to each of these gates. The five outputs of these gates would be connected to the five bit positions of F register 160. A similar arrangement would exist for the lines 141–145 and the other F registers. Likewise, five lines would connect the five bit positions of F register 160 to five corresponging AND gates like gate 223, each gate being connected also to line 222, and the five outputs of these gates would be connected by lines like line 146 to the five bit positions of the register of local store 20 containing quantity A. A simliar arrangement is provided for the lines 147–151 and the other F registers.

Figure 7:
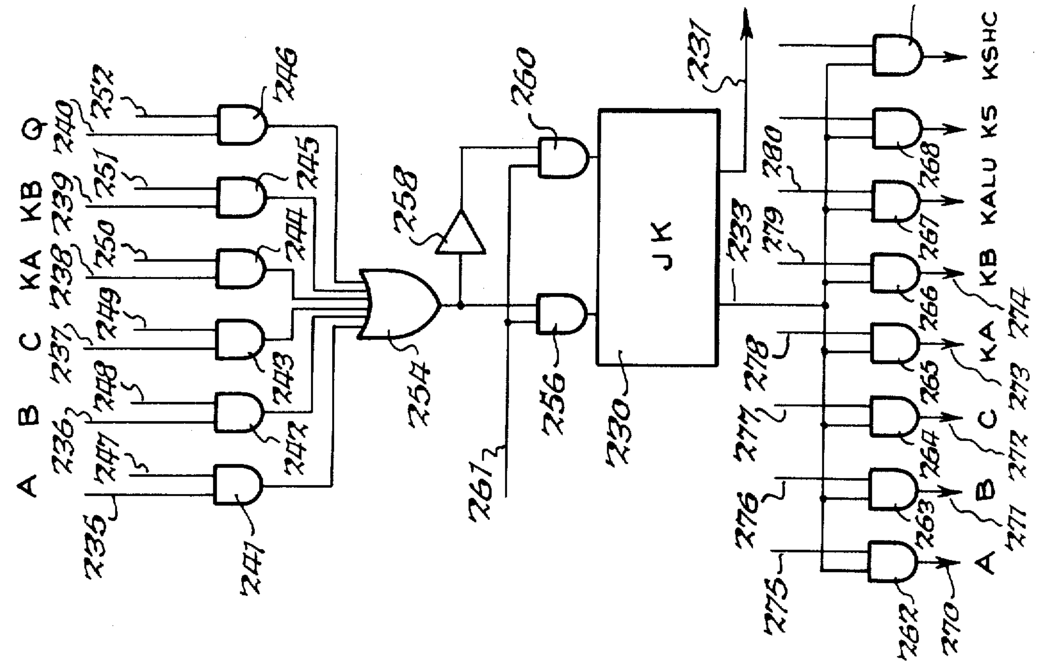
FIG. 7 is a logic diagram of one bit position of a register of the type shown in FIG. 6.

The foregoing is illustrated in further detail by the circuit of FIG. 7 which represents a single bit of an F register, for example any of the F registers shown in FIGS. 5 and 6 such as register 110 of FIG. 5. Each F register is six bits in length, so the circuit of FIG. 7 would be duplicated six times to provide a single F register like register 110. Each F register bit includes a J-K flip-flop 230, one output of which is connected by a line 231 to an input of the corresponding decoder, for example the decoder 124 of FIG. 5 in the R register selection system. Thus each F register would have five lines like line 231 connected to the five corresponding input terminals of the decoder, as illustrated in FIG. 5. The other output of flip-flop 230 is present on a line 233 and is utilized in a manner which will be described in detail presently.

At any given time flip-flop 230 can be provided with an input corresponding to the quantities A,B,C,KA,KB, and Q. These inputs are present on lines 235–240 shown in FIG. 7 which are connected to inputs of corresponding AND gates 241–246. The other inputs of AND gates 241–246 are connected by lines 247–252, respectively, to the appropriate OR gates which, in turn, are connected to decoders in the F register selection system shown in FIG. 6. For example, line 247 might be connected to the output of OR gate 176 which, in turn, is connected to decoder 166, for the quantity A. Similarly, line 248 might be connected to the output of OR gate 193 which, in turn, is connected to decoder 167 for the quantity B. As shown in FIG. 7, the output of AND gates 241–246 are connected to the inputs of an OR gate 254, the output of which is connected through an AND gate 256 to one input of flip-flop 230. The output of OR gate 254 is connected also through an inverter 258 to an AND gate 260, the output of which is connected to the other input of flip-flop 230. The other inputs of AND gates 256 and 260 are connected to a line 261 which normally applies logical one input to these gates. In response to the nanofunction SKIP, however, line 261 applies an inhibit pulse to the inputs of gates 256, 260. In other words, when skipping is desired the circuit allows the inputs to be present but inhibits flip-flop 230 thereby accomplishing the same result as if each input itself were inhibited but doing so in a relatively more efficient manner.

The other output of flip-flop 230 is connected by a line 233 to the input of each of a plurality of AND gates 262–269. The outputs of these AND gates are connected to various destinations such as the register of local store 20 which stores the quantities A,B and C, or the bit positions in the K-vector field of control matrix 48 for the quantities KA, KB, KALU, KSHC, and KS. The other inputs of gates 262–266 are connected by lines 275–279 to the appropriate decoder in the F register selection system shown in FIG. 6. For example, line 275 might be connected to the output of decoder 221. The other lines, for example lines 276–279, are connected to outputs of appropriate decoders in the fourth or far right-hand column in the arrangement of FIG. 6, the decoders of this column being used exclusively for controlling the transfer of quantities from the F registers to the selected destinations. Additional decoders and accompanying connections would be provided in this group or column for the destinations KS and KSCH.

Assume, for example, that it is desired to transfer the currently available value of quantity A to an F register in which the circuit of FIG. 7 forms the first bit position. Line 235 connects the first bit, which we will assume is a one, to AND gate 241 which also receives a logical one input by line 147 from one of the A decoders of FIG. 6. As a result, the state of flip-flop 230 will be set to one corresponding to the state of the bit position of quantity A. Similar events occur simultaneously in each of the five other circuits identical to the circuit of FIG. 7 which form the entire six bit F register, the six flipFlops of these circuits developing states corresponding to the states of the six bit positions in A. The outputs of these flip-flops are connected by six lines like line 231 to the inputs of a decoder provided for that particular F register according to the arrangement of FIG. 5. If it is desired to transfer the quantity present in the F register to the register storing quantity A, their logical one inputs appear simultaneously on the six lines corresponding to line 275, and six lines corresponding to line 270 make the transfer.

Arithmetic And Logical Function Units

Arithmetic and logical unit 24 takes the two eighteen bit values present on the left and right inputs from buses AIL and AIR, respectively, to develop an 18 bit result and four condition bits: sign, low-order 17 bits of result equal to zero, carry, and overflow. These four condition bits are termed local condition bits. Unit 24 performs 16 arithmetic and logical operations as specified by the value or contents of the nanofunction KALC, the fifth bit or KALC specifying whether the operation is arithmetic or logical and the low order 4 bits thereof specifying the particular operation. This is summarized in Table III where L, R refer to Left, Right.

TABLE III

| Low 4 bits of KALC | Logical Function (KALC Fifth Bit=0) | Arithmetic Function (KALC Fifth Bit=1) |
|---|---|---|
| 0000 | Not L | L |
| 0001 | NOT (L or R) | L or R |
| 0010 | NOT L and R | L or NOT R |
| 0011 | ALL ZEROS | ALL ONES |
| 0100 | NOT (L AND R) | L PLUS (L and not R) |
| 0101 | NOT R | (L or R) plus (L and not R) |
| 0110 | L XOR R | L minus R minus 1 |
| 0111 | L AND NOT R | (L and not R) minus 1 |
| 1000 | NOT L OR R | L PLUS (L and R) |
| 1001 | NOT (L XOR R) | L PLUS R |
| 1010 | R | (L or not R) PLUS (L and R) |
| 1011 | L AND R | (L AND R) minus 1 |
| 1100 | ALL ONES | L PLUS L |
| 1101 | L OR NOT R | (L or R) PLUS L |
| 1110 | L OR R | (L or not R) PLUS L |
| 1111 | L | L MINUS 1 |

The nanofunction KALC is applied to arithmetic and logical unit 24 by a plurality of control lines from control matrix 48, collectively represented by line 50 connected to unit 24. Arithmetic and logical unit 24 is continuously developing a result, but it requires somewhat less than two T or system clock periods to develop a proper result from new L and R inputs. For this reason the nanofunction FILL ALU is provided and when applied to unit 24 by one of the control lines collectively designated 50 causes the current result developed by unit 24 to be latched into the result hold register 26. Like other nanofunctions, FILL ALU takes effect at the end or trailing edge of the T period in which it is specified, and if values are gated into the F registers FAIL and FAIR in period T$n$, thus changing the inputs to unit 24 from local store 20, then a FILL ALU nanofunction in period T$n$ + 2 will place the correct result in the ALU hold register 26. Furthermore, since all register transmissions in the system of the present invention are implemented in synchronous logic, new values may be gated into F registers FAIL and FAIR in the period T$n$ + 2. The same timing effect is achieved if the new FAIL and FAIR bus connections are made in a T-vector which is followed next in time by a successor T-vector specifying a FILL ALU nanofunction, provided the latter T-vector is stretched by the presence of the STRETCH nanofunction in a manner which will be described presently. The FILL ALU nanofunction also latches the four arithmetic local condition bits, and the GATE ALU nanofunction operates the AOD bus to gate the result in hold register 26 to local storage means 20. Arithmetic and logical unit 24 is representative of various commercially available units which can perform satisfactorily in the system of the present invention, and since such units are readily familiar to those skilled in the art a detailed description thereof is believed to be unnecessary.

Shifter unit 28 in the present illustration is an eighteen bit register which can be used in conjunction with result hold register 26 of unit 24 or independently to accomplish shifting of double or single length quantities. For example, in performing single right or left logical shifts, the value in shifter 28 is shifted to the right or left, respectively, and the shifter 28 is filled with zeros from the left or right. A double logical shift right or left is performed by shifting the entire quantity in result hold register 26 and shifter 28 logically to the right or left, respectively, and filling in with zeros on the left or right, respectively. Shifter 28 and register 26 cooperate to provide a double rotational shift to the right whereby the entire quantity is rotated to the right with the bits that are shifted out of register 28 entering the high order end of register 26. Likewise, a double rotational shift to the left is performed by rotating the entire quantity to the left with the bits that are shifted out of register 26 entering the low order end of shifter 28. A double shift right arithmetic is performed by shifting the entire quantity in register 26 to the right with the high order bit contained in result hold register 26 remaining the same as before the shift. A double shift left arithmetic is performed by shifting the entire quantity to the left in a manner similar to the double shift left logical, but the overflow bit is set if the bit shifted in changes the high order bit of the result hold register 26.

Shifter 28 is provided with 18 bit quantities from the SID bus under control of the LOAD SH nanofunction, and quantities present in shifter 28 are gated therefrom through the SOD bus under control of the GATE SH nanofunction. In double-length, end-off shifts a 37th bit is also used and is the local condition carry bit generated by arithmetic and logical unit 24. The two nanofunctions SET CARRY and RESET CARRY are provided to manipulate this bit which is also the carry-in bit of unit 24.

Two nanofunctions contain information for sepcifying shifts. The function KSHC determines the type of shift and the function SH COMMAND specifies the length of the shift in number of bit positions. In particular, different bits of KSHC initiate different types of shifts, and one bit indicates whether the shifting is to be conditional or unconditional as will be explained presently. One bit of SH COMMAND clears the shifter to zeros, and the remaining five bits command shifts of 16, 8, 4, 2 and 1 bits. Since shifter 28 is capable of only one of the operations specified by SH COMMAND at a given time, if two lengths of shift are specified together, the results of the two different shifts apear ORed together in shifter 28.

When the appropriate bit of nanofunction KSHC indicates that shifting is to be unconditional, the control bits are taken directly from the six bit SH COMMAND field in the K-vector of the current nanoword. When shifting is to be conditional, the SH COMMAND field is logically ANDed with the value in F register FSIV to yield the final control function. For example, a variable length shift microinstruction thus can be obtained by using four T-periods to shift conditionally on each appropriate bit in F register FSIV, which will have been loaded with the shift-length parameter. The nanofunction LOAD SH which operates the SID bus can be in the T field which would be a one bit field of T40, or it can be included in the SH COMMAND nanofunction.

Input-Output And Interrupt System

Figure 8:
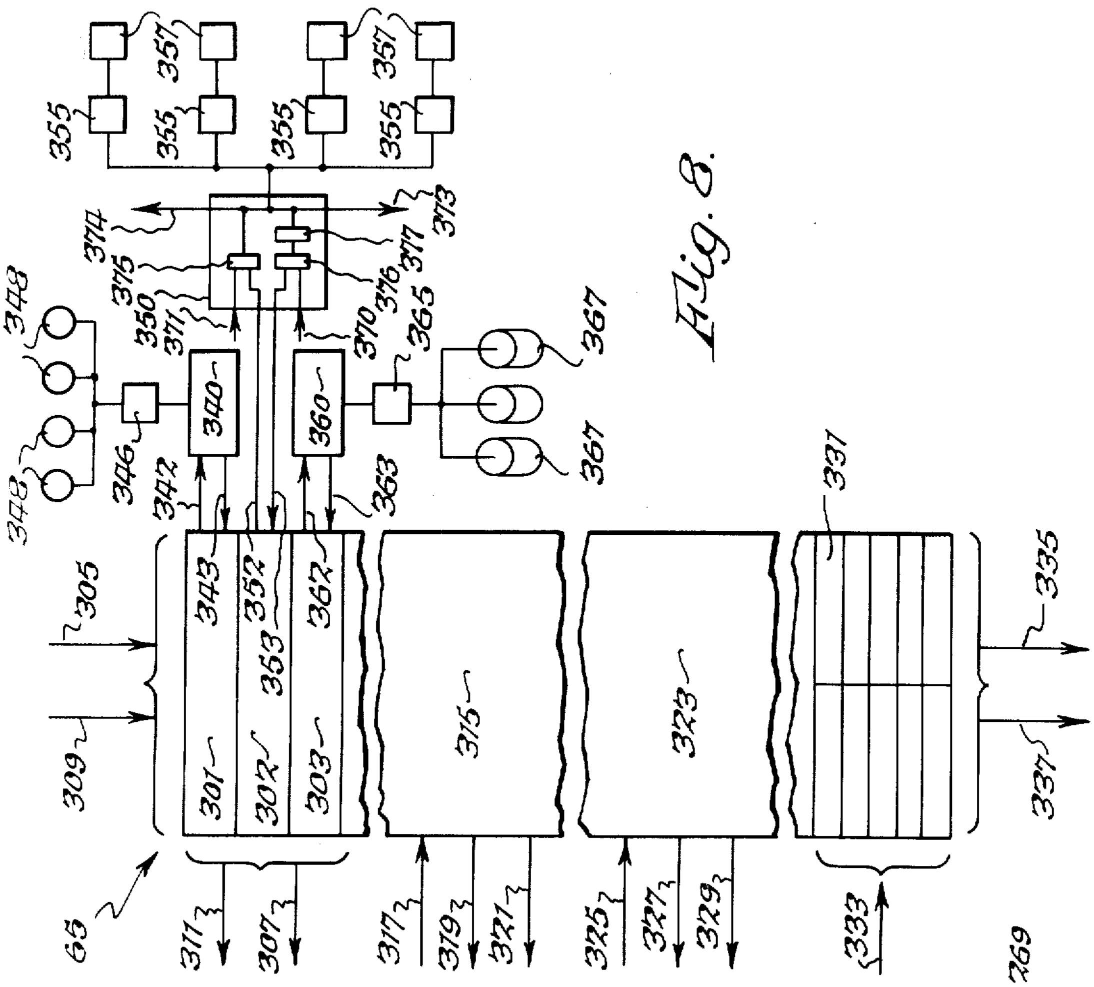
FIG. 8 is a schematic block diagram of the input-output arrangement in the system of FIG. 1.

FIG. 8 shown in diagrammatic form the organization of input-output and interrupt equipment around external storage means 65 in the system of the present invention. External store 65 contains a plurality, for example 32, of uniformly addressed and accessible 18 bit register, one group of which is known as channel registers which provide an external interface between input-output equipment and the system of the present invention. According to a preferred mode of the present invention there are eight channel registers, and three registers are shown at 301–303 in FIG. 8. One channel register is dedicated to each input-output channel and interfaces with a channel control unit which will be described presently.

Line 305 in FIG. 8 represents an extension of the eighteeen bit path from main store 22 to local store 20 through MOD bus to the registers of external store 65 as shown in FIG. 1, and line 307 represents a similar path extension from registers of external store 65 through MIX bus to local store 20 and main store 22. When the F registers FMOD and FMIX contain values greater than 31, i.e., when the high order bit is one, then these F registers address the channel registers of external store 65 with the low five bits of the F register, rather than registers of local store 20. A selection circuit arrangement similar to that of FIG. 5 would be connected to the channel registers of external store 65, the circuit being responsive to the presence of a one in the sixth or high order bit position of the F registers FMOD and FMIX.

Line 309 in FIG. 8 represents the 18 bit path from local store 20 to the channel registers of external store 65 and including buses EID and EIA, and line 311 represents the path from the channel registers of external store 65 to a local store 20 and including buses EOA and EOD. This arrangement provides addressing of all registers of external store 65, and immediate access to any external register is allowed by having the two buses connecting local store 20 and external store 65 each require double addressing. Thus the quantity placed in F register FEID specifies the register of local store 20 from which data is to be transmitted in response to the WRITE ER nanofunction, and the quantity placed in F register FEIA specifies the register of external store 65 into which the data is to be transmitted. Similarly, the quantity in F register FEOA specifies the register of external store 65 from which data is to be transmitted in response to the GATE ER nanofunction, and the quantity in F register FEOD specifies the register of local store 20 into which the data is to be transmitted.

As shown in FIG. 1, line 56 connected to external store 65 represents connection of F registers of group 54, i.e. registers FMIX, FMOD, FEID, FEIA, FEOA and FEOD, to registers of external store 65 for selection of the same. As pointed out in connection with the channel registers, a circuit similar to that of FIG. 5 is provided for selecting registers of external store 65 according to values or quantities placed in the above-identified F registers. The system paths controlled by the MOD and MIX buses are selectively connected to only the channel registers, whereas the system paths controlled by buses EID, EIA and EOA, EOD are selectively connected to all registers of external store 65.

External storage means 65 further comprises a plurality of general purpose registers, for example 15, designated collectively at 315 in FIG. 8. These registers can be used for general working-storage, and they also serve as 18 bit source values for the fast increment function of the special registers of local storage means 20. Line 317 represents the 18 bit path from local store 20 to the general purpose registers and including buses EID and EIA, and line 319 represents the path from the general purpose registers of external store 65 to local store 20 and including buses EOA and EOD. Selection of particular general purpose registers for connection to these paths is done in a manner identical to that of the channel registers and paths 309 and 311. Line 321 represents an 18 bit path from selected general purpose registers to selected fast increment registers of local storage means 20. The address of the local store registers is selected from several sources under control of the AUX SEL nanofunction, and the increment values are stored in the general purpose registers of external store 65 and selected under control of the INC SEL nanofunction in a manner which will be described in detail presently.

External storage means 65 further comprises a plurality of auxiliary registers, for example four, indicated generally at 323 in FIG. 8. These registers can be used for storing an auxiliary quantity such as the quantity Q referred to hereinbefore. Line 325 represents the path from local store 20 to the auxiliary registers and including buses EID and EIA, and line 327 represents the path from the auxiliary registers of external store 65 to local store 20 and incuding buses EOA and EOD. Selection of particular auxiliary registers for connection to these paths is done in a manner similar to that of the general purpose registers and channel registers. Line 329 represents a path between auxiliary registers of external store 65 and F registers of group 54.

External storage means 65 is completed by a plurality of interrupt registers, for example five 18 bit registers, which contain addresses in nanostorage means 40 associated with each interrupt. In particular, each register is divided or separated into two parts whereby these registers of external store 65 provide 10 interrupt addresses in nanostore 40, one of these ten registers being designated 331 in FIG. 8. Line 333 represents the path from local store 20 to the interrupt registers and including buses EID and EIA, and line 335 represents the path from the interrupt registers of external store 65 to local store 20 and including buses EOA and EOD. Selection of particular interrupt registers for connection to these paths is done in a manner similar to that of the general purpose registers and channel registers. Line 337 collectively represents a plurality of lines connecting bit positions of the 10 interrupt registers to priority selection means 42 associated with nanostore 40 in a manner which will be described in detail further on in the specification.

When an interrupt signal is generated in the system, this causes fetching of a nonoinstruction at the address in nanostore 40 associated with that interrupt, the address being stored in one of the interrupt registers of external store 65, and the fetched nanoinstruction presumably is designed to respond to the condition causing the particular interrupt. Most of the interrupt signals originate from the input-output channels, but others can be provided to indicate hardware failure or program error or to occur in response to an external signal.

FIG. 8 illustrates several input-output configurations which can be used in the system. All input-output events are organized around the interfaces or channels between each channel register of external storage means 65 and an associated channel control unit. One channel control unit is designated 340 in FIG. 8, and lines 342, 343 connecting unit 340 to channel register 301 represent an 18 bit, two-way path between register 301 and unit 340. A device control unit 346 is connected to unit 340, and one or a number of input-output devices 348 such as tape drives are connected to device control unit 346. The device control unit 346 serves as a multiplexor for driving the plurality of devices. This configuration wherein a single device control unit is connected to the channel control unit is a dedicated channel type of configuration.

Another channel control unit 350 is shown in FIG. 8, being connected to channel register 302 by an 18 bit, two-way path represented by lines 352, 353, and in this configuration channel control unit 350 is connected to a plurality of device control units 355. This is a multiplex type of channel configuration. The device control units 355 are connected to corresponding input-output devices 357 such as card readers, card punchers, and printers. This type of channel configuration is used in communicating with low speed devices, and the devices need not be identical.

FIG. 8 includes another example of a dedicated channel configuration including a channel control unit 360 connected to channel register 303 by an 18 bit, two-way path represented by lines 362, 363, a device control unit 365 connected to unit 360, and a pluraltiy of devices 367 such as discs or drums.

Control of input-output events by the system of the present invention will be described in connection with one channel in the arrangement of FIG. 8, and it is to be understood that control is identical in the other input-output channels. Referring now to the channel including channel register 302, channel control unit 350 has two incoming control signal lines 370, 371 and two outgoing interrupt lines 373, 374. Line 370 transmits a data command signal to channel control unit 350, and line 371 transmits a function command signal to unit 350, in both instances under nanoprogram control. In particular, selection of the particular line to be activated is controlled by the nanofunction KIO. According to a preferred mode, if the one bit field in the K-vector of the current nanoword for KIO is a one, the data command line 370 is selected, and if that bit is a zero, the function line 371 is selected. Then, a nanofunction XMIT I O in each T-vector of the current nanoword activates the selected line thereby providing a commmand signal on the line. When a function command signal is present on line 371, an 18 bit word containing function commands is transferred from channel register 302 through path 352 and into a register 375 of channel control unit 350 wherein the word is decoded to provide the appropriate commands for the channel operation. This eighteen bit word was stored previously, of course, in local store 20 or in main store 22. When a data command signal is present on line 370, an 18 bit word is transferred from the channel through a register 376 and through path 353 into channel register 302 from which it will be transferred from the channel through a register 376 and through path 353 into channel register 302 from which is will be transferred thereafter to local store 20 or main store 22. A buffer register 377 is provided to accommodate time differences between operation of input-output devices and the rest of the system.

The particular channel to which the 18 bit function command word is to be transferred from local store 20 or main store 22, which in the present example is channel register 302, is identified by the quantity in F register FEIA. The nanofunction RESET IO clears to zeros the channel register FEOA after an input data word supplied by the channel control unit is transmitted from external store 65 to local store 20 or main store 22. This is because data supplied by the channel control units is ORed, rather than gated, into external store 65, and it is necessary to clear the channel register so that the next word supplied by the channel control unit can be ORed into the register. The RESET I0 function is supplied by a control line connected into the appropriate location in the selection circuit for the external store registers which, as previously mentioned, is similar to the selection circuit of FIG. 5. Line 373 transmits an attention data interrupt from unit 350 to the system, and line 374 transmits an attention status interrupt from unit 350 to the system. It is to be understood that the foregoing arrangement described for the input-output channel including register 302, is repeated for all the other channels and included channel registers.

The function command instructs the channel control unit to accept and act on the 18 bits of function information present in the channel register, which information word previously was supplied to the channel register from main store 22 or local store 20. Examples of functions include begin-read, begin-write, and device-select-number, if appropriate. A special function of all zeros is provided to inform the channel control unit that the system has accepted and processed the last transmitted word in a read operation, so that the channel control unit can send the next word if and when it is ready. The data command instructs the channel control unit to accept the 18 bits of data present in the channel register in a write operation.

The attention data interrupt is used by the channel control unit in a read operation to notify the central processor that it has just placed a word of data in the channel register. In a write operation, the channel control unit uses the attention data interrupt to notify the central processor that it has accepted and processed the last transmitted word, so that the processor can send the next word if and when it is ready. The attention status interrupt notifies the central processor that the channel control unit has completed its previously assigned function, for example a block read, whereupon the processor may then query status to determine if the completion is normal or under error circumstances.

Each channel control unit, such as unit 350, also includes a word count register and a completion-character register. The data buffer 377 is a five word buffer and serves to lessen the possibility of unsuccessful transfer due to the processing of high-level interrupts or the execution of long, uninterruptible nanoprograms. A "lost-data" bit is present in the channel control unit status word to indicate that a transfer was not successful due to out-of-range delays. The word count register and completion-character register are provided with appropriate functions and controls, and an attention status interrupt is generated in the appropriate situation whereby the task of detecting transfer completion may be assumed by the system hardware.

The manner in which the occurrence of an interrupt signal, for example an interrupt signal generated in response to an input-output operation and present on lines 373, 374, causes fetching of a word or instruction in nanostore 40 at an address corresponding to that interrupt will become clear presently when the addressing arrangement for control store 32 and nanostore 40 is described in detail. Briefly, each interrupt signal is ANDed with an enabling bit before it is applied as an input to a corresponding interrupt latch. The enabling bits, which provide programmed control of the interrupt system, are stored in registers of external storage means 65. If an interrupt signal is active when its enabling bit is off it does not cause an interrupt, but the interrupt is held pending until the associated enabling bit is turned on or the interrupt has been cleared.

Nanostore And Control Store Addressing

Figures 9, 10:
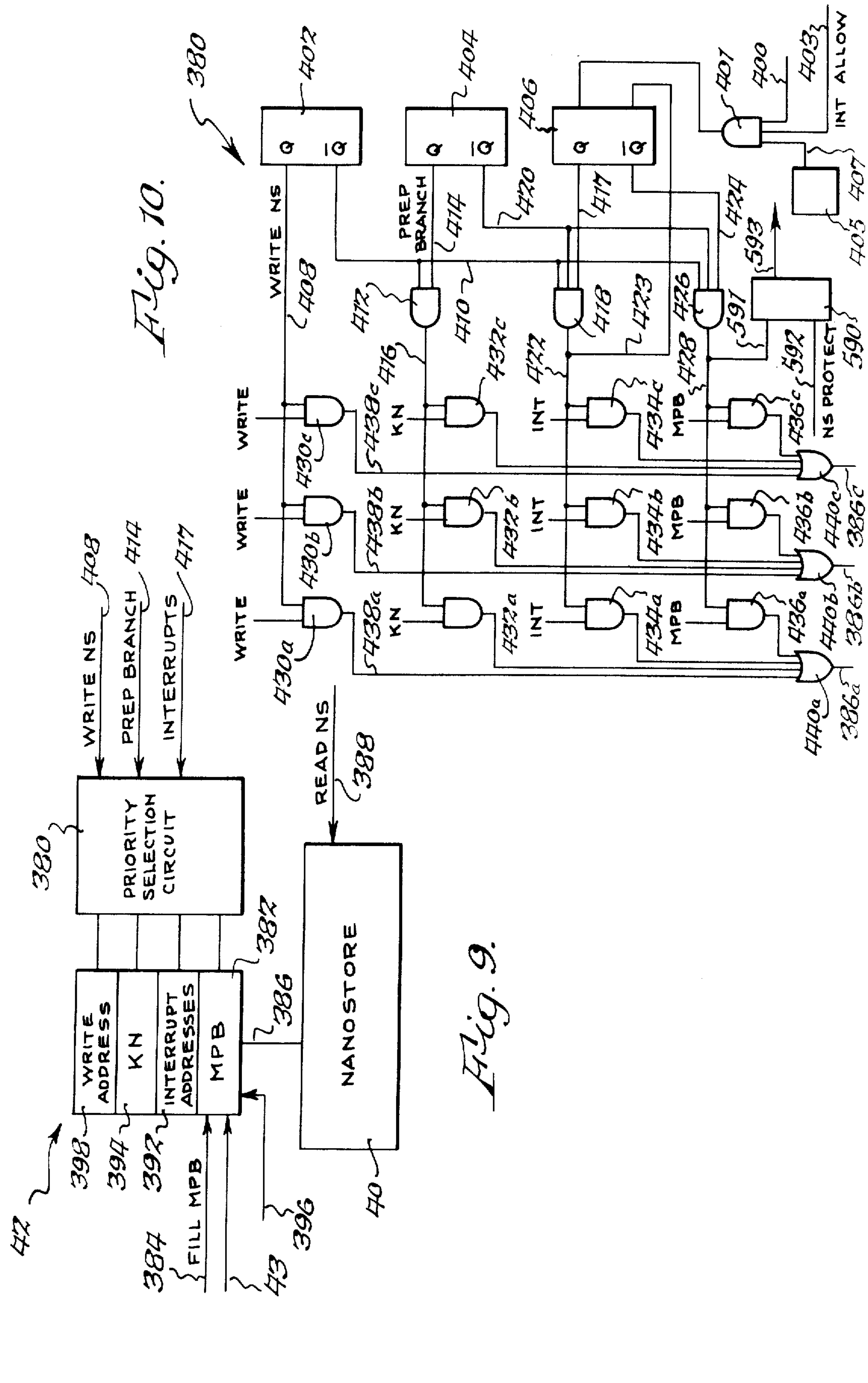
FIG. 9 is a diagrammatic illustration of an arrangement for addressing one of the storage means in the system of FIG. 1.
FIG. 10 is a logic diagram of the arrangement of FIG. 9.

FIGS. 9 and 10 illustrate the arrangement of the present invention for addressing nanostorage means 40 to obtain the current nanoword or nanoinstruction according to a priority scheme. In FIG. 9 a plurality of address sources are arranged in a tier in order of ascending priority with selection being controlled by a priority selection circuit 380. The lowest priority address is the current instruction from control store 32 which is transmitted by line 43 to a microprogram buffer register 382. Register 382 is filled in response to a FILL MPB nanofunction which appears on a control line 384 connected to register 382. If no other address sources are active as determined by circuit 380, the next nanoinstruction is involsed by the next microinstruction. Thus, the 10 bit address in register 382 is transmitted through a 10 bit path 386 to nanostore 40. Then the nanoword or nanoinstruction having that address is read when a READ NANOSTORE nanofunction appears on a control line 388.

If, however, any interrupts are active and enabled, an interrupt signal will be present on a line 417 connected to priority selection circuit 380 which will cause the address of the next nanoinstruction to be taken from a register associated with the highest priority active and enabled interrupt. In FIG. 9, the group of interrupt registers is designated 392, it being understood that this is the same group of interrupt registers which are physically located in external storage means 65, one of which is designated 331 in FIG. 8. This occurs only if no other higher order address sources are active. Thus, the next nanoinstruction address is taken from one of the interrupt registers in the group 392 and transmitted by path 386 to nanostore 40. As a result, processing of microinstructions is postponed, and it is therefore possible to execute independent nanoprograms which are not invoked by microinstructions.

According to the arrangement of the present invention, a branch within nanostore 40 has a still higher priority so that nanoprograms, and hence microinstructions, are not interruptible. The address source for a branch operation is designated 394 in FIG. 9 and is the 10 bit field KN in the K-vector of the branching nanoinstruction. The PREP BRANCH bit is present in the K-vector of that nanostruction and provides the PREP BRANCH nanofunction on a line 414 connected to priority selection circuit 380 causing the latter to gate the KN address through path 386 to nanostore 40.

The highest priority address source in the arrangement shown in FIG. 9 is the write address 398 which is gated to nanostore 40 under control of circuit 380 in response to the presence of a WRITE NS nanofunction transmitted to circuit 380 by a control line 408. The manner in which the 10 bit address 398 is obtained in the system of the present invention will be described in detail presently. The arrangement can, of course, include an even higher priority interrupt which becomes active upon hardware failure or in response to a "runaway" program. The ten bit address contained in register 382 is the combination of the 7 bit microinstruction op code from path 43 and a 3 bit index or page number from F-register FIDX through a path 396 for reading up to 1K words available in nanostore 40 which has the same timing characteristics as control store 32.

FIG. 10 shows a portion of a preferred circuit for implementing the arrangement of FIG. 9. Flip-flops 402 and 404 represent the flip-flops of control matrix 48 at the T-field bit positions of the nanofunctions WRITE NS and PREP BRANCH, respectively. It will be recalled that each flip-flop provided for the bit positions of control matrix 48 produces a true and a complement output designated Q and $\overline{Q}$, respectively. The true output of flip-flop 402 is present on a control line 408 for gating the nanostore write address in a manner which presently will be described. The complement output of flip-flop 402 is connected by a control line 410 to one input of an AND gate 412, and a control line 414 connects the true output of flip-flop 404 to the other input of AND gate 412. The output of AND gate 412 is present on a line 416 for gating the branch address KN.

A line 400 connects an interrupt signal to one input of an AND gate 401, and a control line 403 connects the INT ALLOW nanofunction to another input of gate 401. One bit position of an interrupt enable register is designated 405 in FIG. 10 and is connected to gate 401 by a line 407. Thus, three conditions must be satisfied: an interrupt must be active, sampling of interrupts must be desired as indicated by the presence of INT ALLOW, and the enabling bit for the particular interrupt must be on. If these are satisfied, gate 401 applied a logical one input to an interrupt flip-flop 406. The true output of flip-flop 406 is connected by a line 417 to one input of an AND gate 418, and the complement outputs of flip-flops 402 and 404 are connected by lines 410 and 420, respectively, as inputs to AND gate 418. The output of AND gate 418 is present on a line 422 for gating the interrupt address. The output of gate 418 also is connected by a line 423 to the other input of flip-flop 406 to turn off the flip-flop to prevent inadvertent interrupting at this same address on the next cycle. The complement outputs of flip-flops 402 and 404 are connected by lines 410 and 420, respectively, along with the complement output of flip-flop 406 by a line 424 to the inputs of an AND gate 426, the output of which is present on a line 428 for gating the address in the microprogram buffer.

Each bit of the various address sources is ANDed with the appropriate one of the lines 408, 416, 422 and 428 for gating to nanostore 40. For example, three of the 10 bits of the write address are shown in FIG. 10 connected as inputs to AND gates 430*a*, 430*b* and 430*c*, the other inputs of these gates being connected to line 408. Only three AND gates are shown for convenience, it being understood that 10 AND gates are provided since the address is 10 bits in length. Similarly, three of the ten bit positions of KN from the K-vector of a nanoword are shown connected as inputs to AND gates 432*a*, 432*b* and 432*c*, the other inputs of which are connected to line 416. Three of the bit positions of the interrupt address are shown connected as inputs to AND gates 434*a*, 434*b* and 434*c* and the other inputs of these gates are connected to line 422. Three of the 10 bits of the address in the microprogram buffer are shown connected as inputs to AND gates 436*a*, 436*b* and 436*c*, the other inputs of which are connected to line 428.

If a WRITE NS nanofunction is present on line 408, a logical one signal appears on line 408 to enable the ten AND gates 430 to gate the write address. As shown in FIG. 10, the outputs of AND gates 430*a*–430*c* are connected by lines 438*a*–438*c* to OR gates 440*a*–440*c*. There are 10 OR gates corresponding to the ten bits of the nanostore address, and path 386 shown in FIG. 9 actually comprises ten lines for these bits, three of which lines are designated 386*a*, 386*b* and 386*c* in FIG. 10. Simultaneously with the occurrence of a logical one signal on line 408 a logical zero signal appears on line 410 from flip-flop 402 and inhibits AND gates 412, 418 and 426 to prevent gating of any other addresses to nanostore. For the KN address to be gated to nanostore 40, a PREP BRANCH nanofunction must be present online 414 and three must be no WRITE NS nanofunction present on line 408. These conditions result in logical one signals being present on lines 414 and 410 to provide an enabling signal on line 416. By proceeding through a similar analysis it should be apparent that gating of the interrupt address requires pressure of a logical one interrupt signal on line 417 and absence of signals on lines 410 and 420 and that gating of the address in the microprogram buffer requires absence of interrupt signals and nanofunctions PREP BRANCH and WRITE NS.

It should be apparent that there will be a number of lines like 400 equal to the number of interrupts in the system and a corresponding number of associated components like flip-flop 406, gate 401 and register portion 405.

Figure 11:
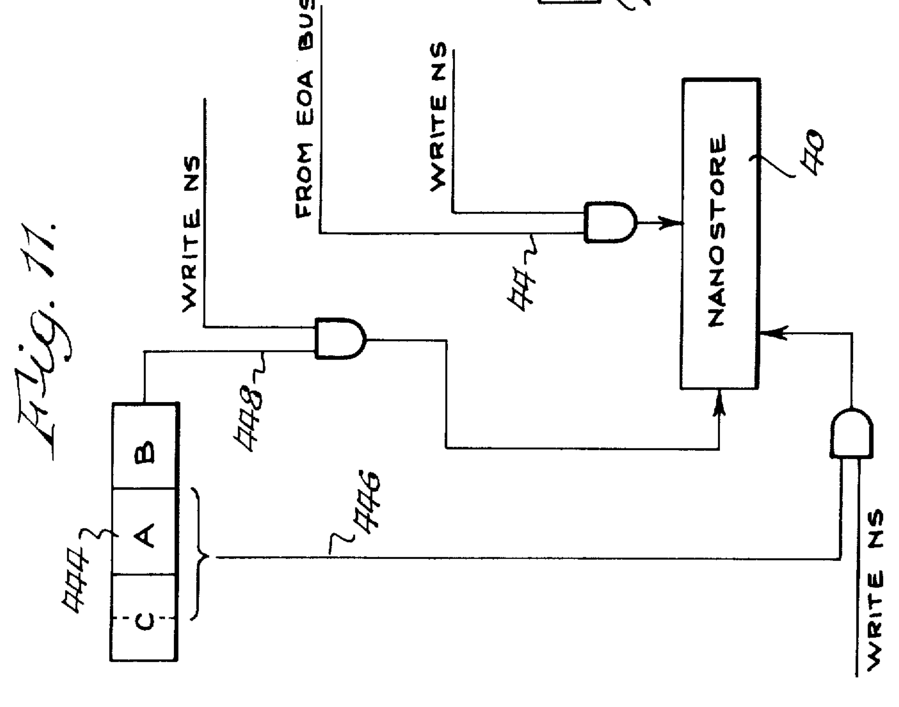
FIG. 11 is a diagrammatic illustration of an arrangement for writing into the storage means of the arrangement of FIG. 9.

FIG. 11 illustrates a preferred arrangement for writing words or instructions into nanostorage means 40. Line 44 represents the 18 bit path from the outupt of bus EOA to nanostore 40, and 18 bit segments of words to be written into nanostore 40 are stored in registers of external storage means 65, selection of the register being controlled by the quantity placed in F register FEOA. The 18 bit segments are supplied to external storage means 65 by input-output channels, main store 22 or local store 20. The address in nanostore 40 where a write operation is to occur is obtained from the A field of the microinstruction and the low order four bits of the C field. This is the 10 bit address source designated 396 in FIG. 9. As shown in FIG. 11, this address is transmitted from the instruction register, here designated 444, by a path 446 and ANDed with the write NS nanofunction whereupon it is applied to nanostore 40. Each nanoword is approximately 360 bits long, and the byte information determining the location of each 18 word segment is obtained from the B field of the microinstruction. The six bits of the B field are transmitted by a path 448 and ANDed with the WRITE NS nanofunction whereupon they are applied to nanostore 40.

Figure 12:
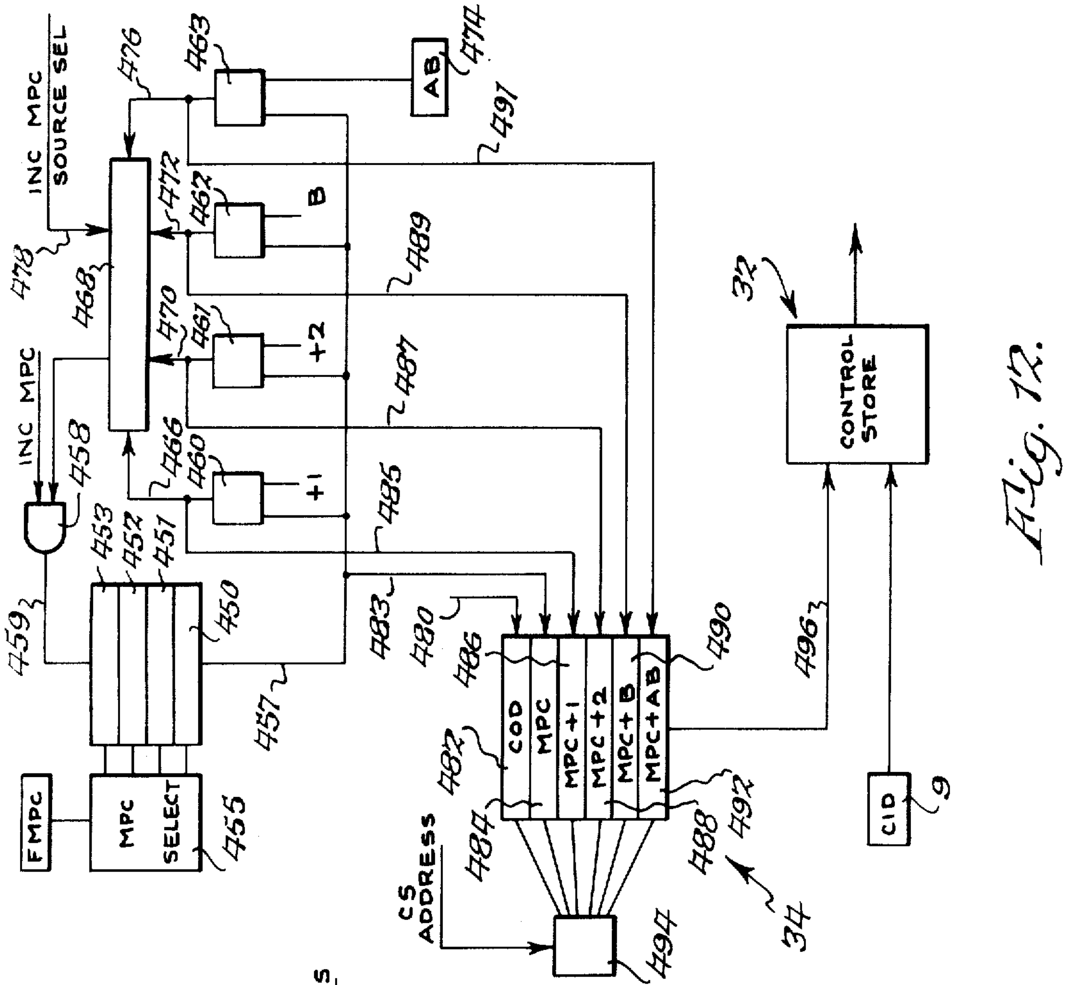
FIG. 12 is a diagrammatic illustration of an arrangement for addressing another storage means in the system of FIG. 1.

FIG. 12 illustrates an arrangement according to the present invention for addressing control storage means 32. The microprogram counter is a selected one of a plurality of fast increment registers of local storage means 20, in the present instance the four registers 450–453 shown in FIG. 12. The quantity in F register FMPC is decoded by a decoding means 455 to select which of the four registers 450–453 is to serve as the microprogram counter during the current microprogram. Upon selection, the register output is connected to a 15 bit output path 457 and simultaneously the input of the selected register is connected to a 15 bit input path 459.

Path 457 will contain the current value of the selected microprogram counter register, and this value is applied simultaneously to one input of each of four adders 460–463. Adder 460 adds the value 1 to the current value and develops the result MPC + 1 which is transmitted by a 15 bit path 466 to one input of a selection means 468. Adder 461 develops the value MPC + 2, which is used when the current instruction is two words long, which value is transmitted by a 15 bit path 470 to another input of selection means 468. The other input of adder 462 is connected to the field B of the current microinstruction, and the result MPC + B developed by adder 462 is transmitted by a 15 bit path 472 to another input of selection means 468. Block 474 in FIG. 12 represents the concatenation of the A and B fields of the current microinstruction, which is applied to the other input of adder 463, and the result MPC + AB is applied by a 15 bit path 476 to another input of selection means 468. The value MPC + B is used as an address for a single jump instruction, and the value MPC + AB is used when a large number of jumps occur. Selection means 468 functions to transmit only one of the foregoing input values as determined by the value in a 2 bit nanofunction INC MPC SOURCE SEL which is applied to selection means 468 by line 478. The selected value is transmitted by a fifteen bit path 458 and under control of the nanofunction INC MPC through path 459 to the previously selected one of the registers 450–453. As a result, that register which supplied the current value MPC now is provided with the incremented value selected from the values: MPC + 1, MPC + 2, MPC + B and MPC + AB.

While the foregoing operation takes place, the current address for control storage means 32 is being selected. In particular, the previous instruction read from control store 32 is transmitted by a path 480 into a bus 482. The value MPC in path 457 is transmitted by a branch path 483 to a bus 484. Paths 485, 487, 489 and 491 connected to paths 466, 470, 472 and 476, respectively, transmit the values MPC + 1, MPC + 2, MCP +B and MPC + AB to buses 486, 488, 490 and 492, respectively. A nanofunction CS ADDRESS has a 3 bit value and is applied to a selection means 494 wherein the nanofunction is decoded to select one of the buses 482, 484, 486, 488, 490 or 492. The value contained in the selected bus is the current address and is gated through a 15 bit path 496 to control store 32.

Test, Increment And Other Arrangements

The system of the present invention tests the following quantities under control of the TEST-SKIP nanofunction: carry bit, sign bit, result equal to zero, overflow bit, low order bit in the shifter, main store busy, interrupt pending, FLIV is zero. In particular, the carry bit and the overflow bit each is one if there is a carry or overflow from arithmetic and logical unit 24. The sign bit is zero or one if the sign is positive or negative, respectively, and the result bit is zero if the result is zero otherwise the bit is one. The low order test bit is a copy of the low order bit in shifter 28. The remaining test bits are one if main store 22 is busy, if an interrupt is pending, and if FLIV is zero, respectively. If the test performed is successful, the system skips one T period. In addition, the testing arrangement in the system of the present invention can test for either the true or complement values of the above-listed quantities when desired.

The TEST-SKIP nanofunction present in the T25 field contains 5 bits. Four of those bits contain in binary code the particular one of 16 test operations to be performed during the current nanoword, in other words the true or complement value of each of the eight indicator bits listed above for a total of 16 operations. The fifth bit is present or on when a test is to be performed. The four bit positions are connected to the four input positions of a 4/16 decoder, and the fifth bit is connected to the decoder in a manner enabling the decoder when the bit is on. Each of the sixteen outputs of the decoder is a possible test signal, depending upon the encoded value of the 4 bit input. The eight decoder outputs corresponding to the true value tests are connected to inputs of eight corresponding AND gates, and the other inputs are connected to the positions of the corresponding indicator bits. If the indicator bit is on and the test signal is present, the AND gate provides a logical one output indicating a successful test. This is applied as an inhibit signal to each of the flip-flops of control matrix 48 which comprise the bit positions of the current nanoword with the result that all nanofunctions are inhibited in the succeeding T vector. The remaining eight decoder bits corresponding to the complement value tests are connected to inputs of eight additional AND gates. Since the complement values of most of the indicator bits is zero, these bit positions can be coupled through an inverter to the other inputs of the AND gates whereby the couplement value provides a logical one input to the AND gate. Each successful test inhibits all nanofunctions in the succeeding T-vector in a manner similar to that of the true value tests. In both instances, the occurrence of a skip consumes one system clock period.

The presence of the nanofunction STRETCH causes the current T-vector to be active for two system clock periods rather than one. This is implemented simply by a control line connecting the STRETCH bit position of control matrix 48 to suitable means associated with system clock 18 for inhibiting the next clock pulse when the STRETCH bit is on. As a result, a T vector is conserved during some ALU, control store and main store operations. In response to each occurrence of the nanofunction DEC LIV, the quantity currently contained by F register FLIV is decremented by one. This is accomplished by connecting the output bit positions of register FLIV to one input of an adder, the other input of which is provided with the decrement value of one. The result or output of the adder is connected to the input bit positions of F register FLIV under control of the nanofunction DEC LIV, such as by means of AND gates.

Figure 13:
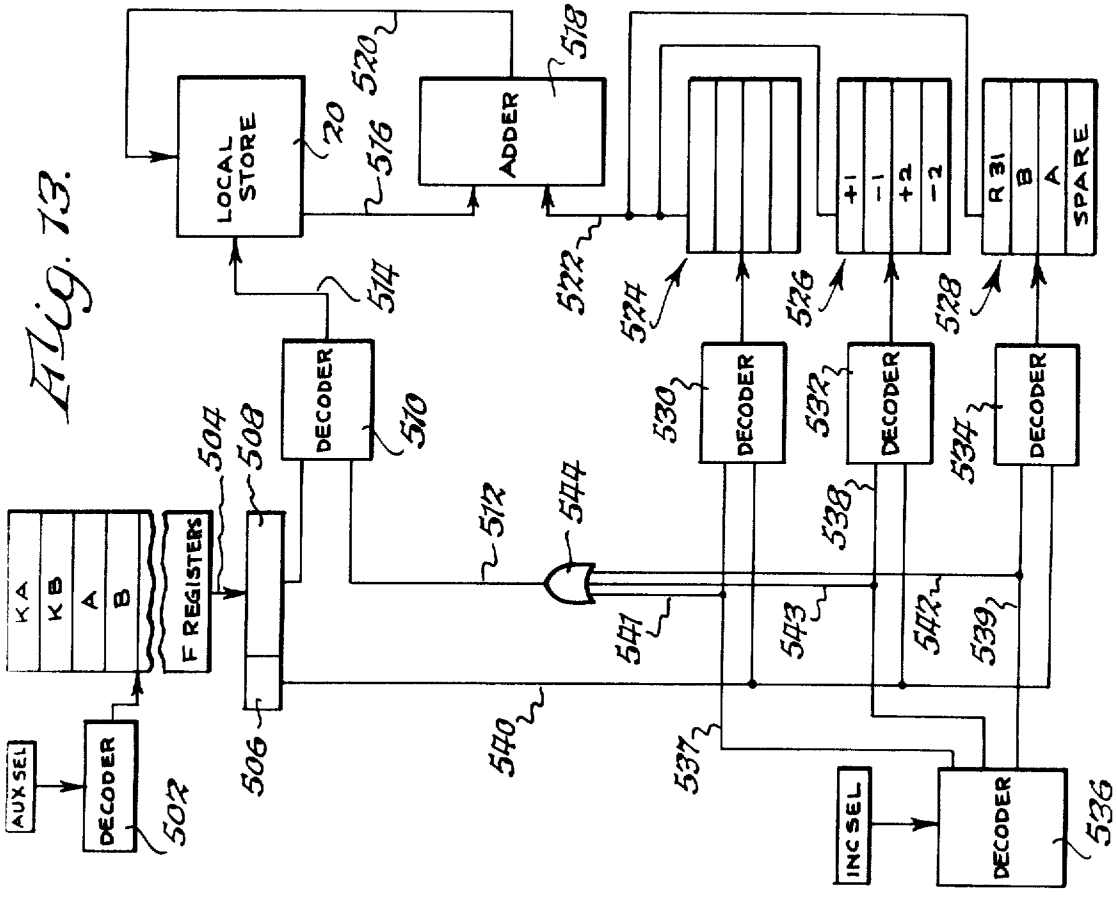
FIG. 13 is a diagrammatic illustration of an arrangement for incrementing quantities in a group of local store registers in the system of FIG. 1.

FIG. 13 illustrates an arrangement according to the present invention for selecting fast increment registers of local store 2o and for incrementing the value contained in the selected register by a selected amount. The four bit positions of an AUX SEL nanofunction in control matrix 48 are connected to the input of a 4/16 decoder 502. The decoded signal is used to select a parameter from the constants KA and KB in the current K-vector, the A and B fields of the microinstruction, and up to twelve F-register values. The parameter selected, as determined by the AUX SEL nanofunction, is transferred by a six-bit path 504 and separated into a two-bit field 506 and a four-bit field 508. The four bits of field 508 are connected to the inputs of a 4/16 decoder 510 which functions to select up to sixteen different registers of local store 20 for fast incrementing. Decoder 510 is enabled by a signal present on line 512, the origin of which will be described presently. The 16 lines connecting the outputs of decoder 510 to registers of local store 20 are collectively designated 514, and when a register is selected its output is connected by an 18 bit path 516 to one input of an adder 518, the output of adder 518 being connected by an eighteen bit path 520 to the input of the selected register of local store 20. The other input of adder 518 is connected by an eighteen bit path 522 to an arrangement for selecting the increment value which now will be described.

The increment value is obtainable from three groups of sources, one group 524 comprising four registers of external storage means 65 each of which can contain any desired value. A second group 526 comprises four registers containing the value +1, −1, +2, −2 which registers also can be part of external storage means 65. A third group 528 comprises the current microinstruction contained in register R31 of local store 20, the parameter B, and the constant KA of the current nanoword. Selection of a particular value from each of the groups 524, 526 and 528 is provided by corresponding decoders 530, 532 and 543, respectively. A nanofunction INC SEL which consists of two bits in a T-field selects the particular decoder which is to be active, and then the selected decoder which is provided with the two bits of field 506 determines which of the four values in its group is to be gated to path 516. In particular, the two bits of the INC SEL nanofunction are applied to the input of a decoder 536, three outputs of which are connected by lines 537,538 and 539 to decoders 530,532 and 534, respectively, for enabling the decoders., The two bits of field 506 are transmitted simulataneously by a two-bit path 540 to decoders 530, 532 and 534. LInes 537,538 and 539 also are connected by lines 541,542 and 543, respectively, to an OR GATE 544, the output of which is connected to enabling line 512 leading to decoder 510.

When a nanoprogram consists of a sequence of nanowords, nonostore 40 should be addressed at the beginning word of the sequence. Any attempt to address nanostore 40 at the second or subsequent word of a sequence of nanowords should signal that an error has occured. This is accomplished by the NS PROTECT nanofunction which is one bit in the K-vector of an nanoword. When a nanoprogram includes only one nanoword, the NS PROTECT bit is a one. When a nanoprogram consists of a sequence or series of words, only the first word of the nanoprogram contains a one in the bit position of NS PROTECT. The remaining words of the program or sequence contain a zero in the NS PROTECT bit position. When nanostore 40 is read with the MPB address, the status of NS PROTECT is tested and an interrupt signal is generated if the NS PROTECT bit is zero. In particular, and referring back to FIG. 10, one input of a comparator circuit or flip-flop 590 is connected by a line 591 to line 428, on which logical one signal is present when nanostore 40 is addressed by he quantity in MPB. The other input of circuit 590 is connected by a line 592 to the NS PROTECT bit position in the K-vector of control matrix 48. Circuit 590 is constructed or set or produce an output signal on line 593 for signalling an interrupt when a logical one is present on line 591 and a logical zero is present on line 592. The foregoing is of course by way of example, and the logical one-logical zero condition of NS PROTECT can be interchanged and the operation of circuit 590 modified accordingly.

Figure 14:
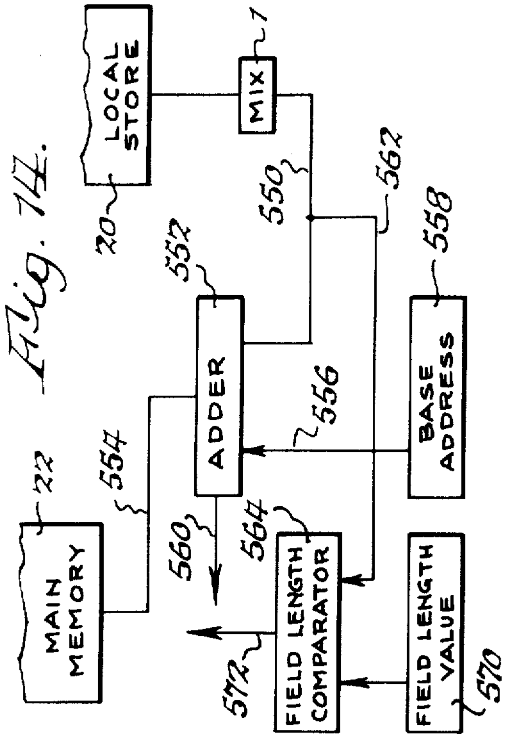
FIG. 14 is a schematic block diagram of a modification of the path from the local store to the main memory in the system of FIG. 1.

A modification of the 18 bit path connecting local store 20 through bus MIX to the input of main memory 22 is shown in FIG. 14. The path, here designated 550, is connected to one input of an adder 552, the output of which is connected by an eighteen bit path 554 go main store 22. The other input of adder 552 is connected by a path 556 to a register 558 which contains a base address quantity. Any attempt to address main store 22 at an address less than the address quantity stored in base register 558 causes adder 552 to generate an interrupt signal on a line 560 which is connected to an appropriate point in the system to provide an indication of this attempt and enable the system to respond accordingly. A branch path 562 connects path 550 to one input of a field length comparator 564, the other input of which is connected by a path 568 to a register 570 containing a reference field length value. Any attempt to address main memory 22 at a field length greater than the reference contained in register 570 causes comparator 564 to generate an interrupt signal on line 572 which like the signal on line 560 enables the system to respond. The foregoing arrangement facilitates control of allocated storage spaces in main memory 22 among multiple users of the system.

Figure 15:
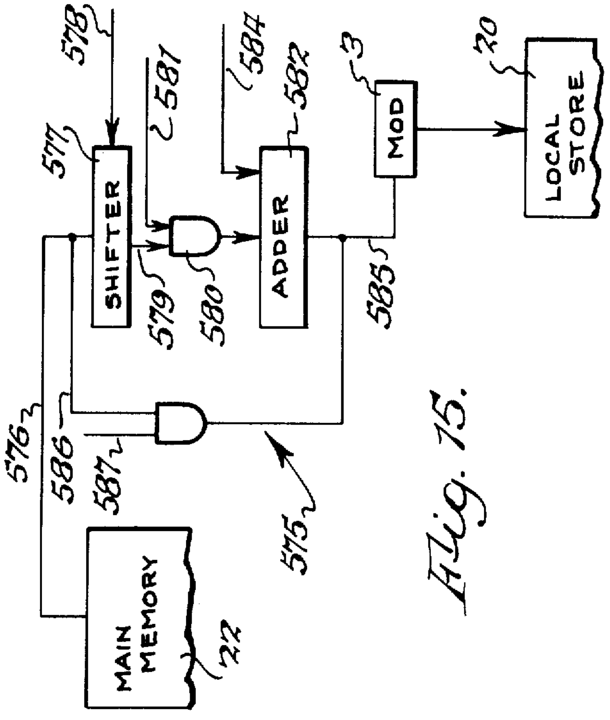
FIG. 15 is a schematic block diagram of a modification of the path from main memory to local store in the system of FIG. 1.

FIG. 15 shows a modification of the eighteen-bit path connecting the output of main memory 22 through bus MOD to local store 20. When the system of the present invention is used in emulating other machines, the instruction words of the machine being emulated are stored in main memory 22. In most instances, the format of the instruction word of the machine being emulated is different from the format of the words stored in control store 32. Therefore, it is necessary to rearrange the bits or groups of bits in the instruction words of the machine being emulated before these words are transferred from main store 22 to local store 20. Means 575 shown in FIG. 15 rotates the bits in the instruction word to change the bit positions, and it masks selected bits or groups thereof whereby only selected bits or groups are gated to local store 20. Means 575 also adds an index value to the gated portion of the instruction word whereby the location in control store 32 addressed by the word can be controlled. Referring now to FIG. 15 line 576 represents the 18 bit path leading from main memory, and means 575 includes a shifter 577 which is eighteen bits wide and to which path 576 is connected. Shifter 577 operates to rotate the bits contained therein by a number of bit positions as determined by the decoded value of the five bit quantity present in a path 578. Path 578 is selectively connected to one of three five bit fields of a register in external storage means 65 in a manner which presently will be described.

The 18 output bit positions of shifter 577 are connected by corresponding lines to one of 18 AND gates, line 579 and gate 580 in FIG. 15 representing one of eighteen similar arrangements. The other input of each AND gate is connected by a line such as line 581 to a corresponding one of 18 bit positions of a mask register in external storage means 65. Accordingly, the bits present in shifter 28 will be gated thorugh means 575 only if a one is present in the corresponding bit position of the mask register, and in this manner only selected bits or groups of bits in an instruction word are gated to local store 20.

Means 575 further comprises an adder 582, one input of which is the eighteen bit path 583 leading from the AND gates such as gate 580. The other input to adder 582 is connected by an 18 bit path 584 to a register of external storage means with contains an 18 bit index value which is added to each word before it is gated to local store 20. The 18 bit output of adder 582, represented by path 585, is gated to local store 20 through bus MOD. Shifter 577, gates 580 and adder 582 of means 575 are by-passed by an 18 bit path 586 under control of the GATE MS present on a control line 587 and which is ANDed with the path. By way of example, there can be three sets of rotate, mask and index values. Therefore, one register of external storage means 65 is divided into three rotate fields, and the mask and index values are stored in two groups of three registers in external storage means 65. The GATE MS nanofunction can contain three bits and determine whether means 575 is to operate or be by-passed through path 586 and the three bits select the three sets of rotate, mask and index quantities if means 575 is to operate.

Illustrative Programs

The operation of the system of the present invention is illustrated in further detail by two programs. A first is for adding the contents of one local store register having the address A to the contents of another local store register having the address B and placing the result in the register having address A as follows:

R(A) + R(B)- - -R(A)

ADDR:
K KALC=ADD, INT ALLOW, FILL STATUS, KA=31.
X . . . RESET CARRY, CLEAR SH, A—FAIL, A—FAOD, B—FAIR, READ CS (MPC + 1).
. S . . FILL ALU, FILL MPB, INC MPC (+1), KA—FSOD.
. . X . READ NS, GATE ALU, GATE SH.
. . . X GATE NS

This program consists of one control store word and one nanoword and requires five T periods or a total time of 0.3 microseconds. The microinstruction has an operation code ADDR and operands A and B. In this and other programs, the operation code or nanoword label is followed by one or more lines of specification for each of the T-periods. The T-period which is active is indicated by a letter X rather than a dot in the appropriate column. The letter S indicates a stretched T-period. K-field information is included in he T-period specifications and designated by the letter K.

This addition is done in 18 bit, 2's complement form. Only two nanofunctions in the K-field specification require explanation. The presence of FILL STATUS causes the local condition bits, such as ALU carry, high order bit of ALU result, overflow from ALU, low order 17 bits of result are zero, and low order bit in the shifter 28, to be placed in corresponding bit positions of the F-register FIST when the nanofunctions GATE ALU and GATE SH are present. By placing the value 31 in KA, the zeros present in the shifter 28 can be dumped into the instruction register of local store 20. Between microinstructions, this register is the only one of local store 20 into which zeros can be placed with complete assurance that no data will be destroyed.

During period T1, the carry bit of unit 24 is reset, zeros are placed in shifter 28, buses AIL and AIR are connected to local store registers specified by quantities A and B, respectively and bus AOD is connected to the local store register specified by quantity A. This is becuase the A parameter is placed in F registers FAIL and FAOD and the B parameter is placed in F register FAIR. In addition, the appropriate bits will be present in the T13-T24 fields to effect the F register transfer control. Also during this T period, control store 32 is read at the address specified by MPC+1. During T2, arithmetic and logical unit 24 is filled with the 18 bit quantities on buses AIR and AIL and adds these quantities becuase KALC specifies an addition. Because unit 24 requires slightly less than two T periods to develop a result, T2 is stretched to two clock periods as indicated by the letter S. Also during this period, the word fetched from control store 32 is gated into MPB register 382 (FIG. 9), the incremented value of MPC+10is gated into the selected fast increment register (FIG. 12), and bus SOD is connected to the instruction register of local store whereby the contents of shifter 28 (all zeros) can be gated to that register in the next T period. The nanofunctions occurring in the T3 and T4 periods do not require any further explanation. Interrupts are sampled at the end of this nanoword becuase INT ALLOW was specified in the K field.

A second program is for multiplying the contents of one register by the contents of another register and placing the result in the combination of both registers as follows:

R(A) * R(B) - - - R(A)//R(B)

MULT:
K PREP BRANCH, KN=M1, KA=2
S . . . QSCR—FSOD, QSCR—FAIL, A—FISA, CLEAR SH, READ CS (MPC+1), READ NS.
. X . . GATE SH, A—FAIR, A—FAOD, A—FSID.
. . X . KA-FLIV, SET CARRY, GATE NS.
M1:
K PREP BRANCH, KN=M2, KALC=SUB.
S . . . FILL ALU, LOAD SH, READ NS, GATE NS NOT/LIV/.
. X . . GATE ALU, A—FSOD, B—FSID, DEC LIV, SET CARRY.
. . S . B—FAIR, B—FAOD, B—FIPH, FIPH—A, SKIP NOT/$S_{LOCAL}$.
. . . X GATE SH, C—FINV—C,
M2:
K PREP BRANCH, KN=M3, KALC=ZEROS, KA=31, KB=18.
X . . . KA—FAIR, KA—FAOD, FISA—C, READ NS.
. X . . C—FAIL, KB—FLIV, FILL ALU, RESET CARRY, GATE NS.
M3:
K PREP BRANCH, KN=M4, KALC=ADD, KSHC=D+R+EO+LOG+UNC.
S . . . GATE ALU, DEC LIV, SKIP NOT/SH-$L_{LOCAL}$/,FAIL—KA.
. S . . FILL ALU.
. . S . SH 1, SKIP/LIV/, FINV—KB.
. . . S READ NS, GATE NS, KA—FAOD, KA—-FLIV, FSID—C.
M4:
K PREP BRANCH, KN=D1, KALC=SUB, KA=ADD, KB=1.
S . . . GATE ALU, GATE SH, C—FAIR, C—FAOD—C, QSCR—FAIL, SET CARRY, READ NS, SKIP NOT/LIV/.
. X . . KA—FIPH, FIPH—KALC, RESET CARRY, DEC LIV.
. . S . FILL ALU, KB—FINV, QSCR—FSOD.
. . . X GATE ALU, C—FAOD, C—FAIR, LOAD SH, GATE NS, FILL MPB.
D1:
K FILL STATUS, INT ALLOW, KA=O, KB=zeroes except "1" in zeroes FISTPOS.
S . . . FILL ALU, INC MPC (+1), READ NS, SKIP NOT/$R_{LOCAL} + S_{LOCAL}$/.
. X . . KB—FIPH, FIPH—KA.
. . X . GATE ALU, GATE SH, KA—FIST, GATE NS.

This program consists of one control store word and six nanowords. Of the six nanowords, five are dedicated and the last word, D1, actually can be shared with a particular type of add-subtract routine. The program requires a minimum time of 139 T periods or 8.34 microseconds and a maximum time of 157 T periods or 9.42 microseconds, depending upon the bit structure of the R(B) operand. In particular, the words MULT, M1 and M2 require 4, 14 and 2 T periods, respectively. Word M3 requires a minimum of 109 and a maximum of 127 T periods, depending on the multiplier. The words M4 and D1 require 6 and 4 T periods, respectively. The microinstruction has an operation code MULT and operands A and B. The multiplication is performed in 18 by 18 into 36 bits, 2's complement form.

The following program conventions are assumed. Between nanoprograms the quantity in F register FLIV is zero and in F register FINV is one. A scratch R-register is available and is connected to any system bus when the quantity QSCR is placed in the F register associated with that bus. The F register FISA is available for nanoprogram scratch. The global status bits in F register FIST are set as follows: S is the sign of the 36-bit product, C and O are zero, R refers to the low 35 bits of the 36-bit product being equal or unequal to zero, and SHL is the low bit of the 36-bit result.

The word MULT provides initialization, and at the exit of this word when a branch to MI is to occur, the following pertinent states exist. Bus AIL is connected to the scratch register, the contents of which is zero by virtue of the connection of the register to bus SOD and the CLEAR SH operation during the stretched T1 period. The local store register identified or addressed by quantity A, i.e. R(A), is connected to buses AIR, AOD and SID. The A parameter is saved in F register FISA, and the MPB register is not filled but control store 32 is read at MPC+1. The carry bit is set, the value in F register FLIV is 2, and registers R(A), R(B), the microinstruction register R31, and MPC are unchanged.

The nanoword M1 performs a test for sign on each of the two operands, and if the original operand is negative, this nanoword performs a 2's complement negation in place. As a result, R(A) and R(B) will have non-negative values in preparation for an unsigned multiplication loop operation. Whenever a negation is not done, an exchange is made between the C field which contains zeros and F registers FINV which by program convention contains the value 1. Thus at the exit from this nanoword, register FINV contains the value 1 if either zero or two negations were necessary. This, in turn, implies that the result of the unsigned multiplication operation need not be negated. Also at the exit, FINV contains the value zero if precisely one operand was negated, and this implies that the product must be negated.

Considering nanoword M1 in further detail, during the period T1 the quantity in R(A) is subtracted from zeros in response to FILL ALU because KALC has the subtract code therein, and bus AIL was connected to the scratch register containing zeros and bus AIR was connected to R(A) at the end of the previous word MULT. The carry bit was set in period T3 of MULT. In response to LOAD SH, R(A) is loaded in to shifter 28 by virtue of the connection of R(A) to bus SID existing at the end of the previous word. Nanostore 40 is read but not gated because F register FLIV contains the value 2. During period T2 of nanoword M1, the nanofunction GATE ALU causes the complement of the R(A) operand to be moved back to R(A), thereby preserving the original R(A) in shifter 28. Bus SOD is connected to R(S) and bus SID is connected to R(B). The quantity in F register FLIV is decremented to 1, and the carry bit in arithmetic unit 24 is set.

In period T3 of this nanoword, buses AIR and AOD are connected to the register R(B). The B parameter is copied into the A field by means of F register FIPH. The sign of the previous subtraction operation, i.e., subtracting zeros from R(A) in T1, is tested. If the sign is positive, meaning that R(A) has been properly negated in place, then the program skips the period T4 and goes directly back to T1 of this word for operation on R(B) as will be described presently. If the sign tested is negative, the program proceeds as usual to period T4 wherein the original R(A) operand is gated from shifter 28 back into register R(A). This is recorded by the C—FINV—C exchange, which is effected by the presence of the appropriate bits in the T13–T24 fields of this nanoword.

Thus, the program returns to the T1 period of the MI nanoword either by skipping from the T3 period or by normal progression from the T4 period, depending upon the result of the test described above. During period T1, the quantity in R(B) is subtracted from zeros in response to FILL ALU, the register FAIR having been given the parameter B during the T3 period and the carry bit having been set in the T2 period. The contents of R(B) are loaded into shifter 28 in response to LOAD SH, the register FSID having been given the parameter B during the previous T2 period. Nanostore 40 is read for the second time, but since F register FLIV contains the quantity 1, the nanostore is not gated.

During the period T2, the nanofunction GATE ALU causes the complement of the R(B) operand to be moved back to R(B), thereby preserving the original R(B) in shifter 28. This is made possible by the placing of the B parameter in FOAD during the previous T3 period. The operation A—FSOD actually connects bus SOD to register R(B) because the B parameter was copied into the A field during the previous T3 period. The bus SID is connected redundantly to R(B), the carry bit is set again, and the quantity in FLIV is decremented to zero. During the T3 period, the transfers B—FAIR and B-FOAD have no pertinent effect, and the copying of the B parameter into the A field is redundant. The sign of the operation where zeros were subtracted from R(B) in period T1 is tested, similar to the sign test of the previous T3, and the program either skips T4 and returns to T1 or proceeds as usual to T4 depending upon whether the sign is positive or negative.

In period T4 the original R(B) operand is gated from shifter 28 back to register R(B) in response to GATE SH. During the T2 period of this operation, bus SOD was connected to R(B). This is recorded as before by the C—FINV—C exchange. During the T1 period the FILL ALU function this time has no useful effect. Shifter 28 is loaded with the contents of register R(B) which possibly is negated. The function READ NS occurs for the third time, and since the quantity in F register FLIV now is zero, nanostore 40 is gated. The result is a branch to nanoword M2, since nanostore 40 was read an odd number of times.

At the exit from the MI nanoword the following pertinent states exist. Bus AIR is connected to the scratch register which contains zeros. Buses AIR, AOD, SID and SOD are connected to R(B). F register FISA contains the A parameter and the microinstruction register, i.e. register R31 of local store 20, has the B parameter in both the B field and the A field. The states of MPC, MPB and control store 32 are the same as before. F register FLIV contains the value zero and FINV contains the negation history as noted above. Registers R(A) and R(B) now contain the absolute values of their original contents, and shifter 28 contains the absolute value of R(B). It is important to note that if either or both operands was $-2^{17}$, this program nevertheless will yield the correct result. In the ordinary case of 2's complement negation, the overflow indication must be checked for the case of $-2^{17}$.

The nanoword M2 serves to initialize the unsigned multiply loop, and at the exit from this word the following pertinent states exist. The local store scratch register contains zeros, and MPC, MPB and control store 32 have the same state as before. Bus AIR is connected to the microinstruction register R31 which is to be used as a partial product accumulator. Bus AOD also is connected to register R31. Bus AIL is connected to R(A) which contains the non-negative multiplicand, and shifter 28 contains the contents of R(B) which is the non-negative multiplier. Bus SOD is connected to R(B). F register FSID contains the B-parameter, and register FINV contains the negation history, as before. The carry bit is reset, and F register FLIV contains the value 18.

The next nanoword M3 is the unsigned multiply loop. The nanofunction KSHC specifies the following shift combination: double, right, end-off, logical, and unconditional. The first iteration serves to zero out the partial-product accumulator, R31, since the ALU hold register 26 contains zeros on entry. Bus control commands are executed in the T1 and T3 periods, although redundantly after the first time, in anticipation of the exit step in period T4. At the exit from this word, the following pertinent states exist. The ALU hold register 26 contains the high-order half of the product. Bus AOD is connected to R(A) and bus SOD is connected to R(B). The C-field contains the B-parameter which was moved from F register FSID during period T4. The contents of FINV, which serves as an indicator, is moved into FLIV for immediate testing later. The local store scratch register contains zeros, bus SID is connected to R(B) and MPC, MPB and control store 32 are the same as before.

The nanoword M4, followed by nanoword D1, is used to negate the double-precision product if necessary. The algorithm is to subtract from zeros if negation is required, and to add zeros if it is not. In both cases, proper global status bits are generated, and the R-bit thereof will refer to the low-order 35 bits of the final product.

During period T1 of word M4, the high and low halves of the unsigned product are moved to R(A) and R(B), respectively. Buses AIR and AOD are connected to R(B) and bus AIL is connected to the scratch register which contains zeros. The carry bit is set in preparation for a subtraction operation which will occur because the KALC nanofunction specifies subtract. The A-parameter is saved in the C field by the C—FAOD—C exchange. If a negation is needed, as indicated by the quantities in FINV and FLIV both being equal to zero, then the program skips to period T3. If no negation of the product is needed the program proceeds to period T2.

In period T2, the operations KA—FIPH and FIPH—KALC change the nanofunction KALC to ADD since KA contained ADD in period T1. The carry is set, and the quantity in FLIV is restored to zero by the function DEC LIV. During period T3, the function FILL ALU causes a subtraction from or addition of zeros depending on whether or not period T2 was skipped. Similarly, the carry bit may be set or reset. The transfer KB—FINV insures that the quantity in FINV is properly restored to one. Bus SOD is connected to the scratch register.

During period T4, shifter 28 is loaded with the quantity in R(B), and the quantity in arithmetic and logical unit 24 is gated back to R(B). Buses AIR and AOD are connected to R(A), since the A-parameter was set into the C field in period T1. The MPB is filled, and then a branch to word D1 occurs. At this point, shifter 28 contains a representation of the low-order half of the product which may need negation. The sole purpose of this is to correctly set the status bit which contains information regarding the low-order bit in shifter 28, and the contents of shifter 28 is gated to the scratch register at the end of word D1. In 2's complement representation, the odd/even characteristic is preserved through negation.

During the T1 period of nanoword D1, arithmetic and logical unit 24 is filled with the contents of the scratch register and R(A) in response to the FILL ALU nanofunction. The scratch register was connected to bus AIL during period T1 of word M4, and bus AIR was connected to R(A) during period T4 of that word. The microprogram counter MPC is incremented. If all 18 bits of the previous value in arithmetic and logical unit 24 were zero, the program skips to period T3, otherwise a normal progression to period T2 occurs. During period T2, the quantity KA which consists of zeros is replaced by a mark containing a 1 in the R-bit position of F register FIST. During the T3 period of word D1, the quantity in arithmetic and logical unit 24 is gated into R(A), and the quantity in shifter 28 is gated into the scratch register. These operations fill the status bit position, and as a result the KA—FIST operation will properly set the R-bit to refer to the 35-bit result being either equal or unequal to zero. Then the program returns to the microcode.

It is therefore apparent that the present invention accomplishes its intended objects. The data processing system of the present invention is capable of extremely flexible and high speed operation, and it allows the user to define system instructions and architecture and if desired also dynamically at the system speed. The system is capable of parallel operation with a relatively large number of data paths, it achieves a useful compromise between horizontal and vertical microprogramming, the instructions thereof provide a flexible combination of instantaneous and residual control, and the system is capable of emulating other machines.

While certain embodiments of the invention have been described with specificity, this is intended by way of illustration, not limitation.

I claim:

1. A data processing system comprising:

a. local storage means for storing data and address information to be processed;

b. operation means connected to said local storage means for performing controlled operations on information supplied thereto from said local storage means;

c. first storage means for storing a plurality of instructions each including an operation code;

d. means connected to said local storage means and to said first storage means for supplying address information from said local storage means to said first storage means for selecting instructions therein;

e. second storage means for storing a plurality of words;

f. means connected to said first storage means and utilizing the operation codes of instructions selected from said first storage means for supplying address information to said second storage means for selecting words therein; and g. control means connected to said second storage means for receiving selected words from said second storage means and connected to said operation means for providing in response to each word control functions to control said system, said control means including means for providing control functions of a first type having a given execution time duration and including means for providing control functions of a second type comprising a plurality of portions presented in a sequence, said portions having execution time durations which in sum equal the time duration of the control functions of the first type.

2. Apparatus according to claim 1, wherein a source of timing pulses is connected to said control means and wherein said control means comprises:

a. register means containing a number of bit postions equal to the number of bits of said control functions of the first type;

b. a plurality of shift registers, one for each bit of said portion of said control function of said second type, and each shift register having a number of positions equal to the number of said control function portions which are presented in said sequence; and c. means connecting said source of timing pulses to said register means and to said shift registers in a manner whereby each of said pulses normally is applied to said shift registers and one of said pulses is applied to said register means upon completion of each complete cycle of said shift registers.

3. Apparatus according to claim 1, wherein said local storage means comprises a plurality of registers and wherein a plurality of paths including buses connect said registers of said local storage means to said operation means in response to functions from said control means and wherein said system further comprises:

a. register selecting means connected to said buses and to the registers of said local storage means and including a plurality of registers each associated with a particular one of said buses, said register selecting means connecting said buses to selected registers of said local storage means as determined by quantities placed in said registers of said selecting means; and b. means connected to said control means and to said registers of said register selecting means for providing selected registers with selected quantities as determined by functions provided by said control means.

4. Apparatus according to claim 1, further including external storage means connected to said local storage means and comprising:

a. a plurality of channel registers for coupling input-output equipment to said system;

b. channel control means connected to said channel registers for controlling the transmission of information between the input-output equipment and said system; and c. means connecting said control means to said channel control means whereby said channel control means is controlled by particular ones of of said control functions provided by said control means.

5. Apparatus according to claim 1, wherein said local storage means comprises a plurality of registers and wherein said means for supplying address information to said first storage means comprises:

a. means connected to said control means and to said local storage means for selecting a register from a group of registers in said local storage means as determined by a function provided by said control means;

b. incrementing means for adding a plurality of quantities to the contents of the register selected from said local storage means and for developing a corresponding plurality of results; and c. means connected to said incrementing means and to said control means for selecting an address quantity from among the plurality of results and the contents of said selected register as determined by a function from said control means and for applying said address quantity to said control storage means.

6. Apparatus according to claim 5 further including means connected to said control means and to said incrementing means for selecting from among the plurality of results and the contents of said selected register as determined by a function from said control means and for placing the selected quantity in the register selected from said local storage means.

7. Apparatus according to claim 1, wherein said means for supplying address information to said second storage means comprises:

a. priority selection means for selecting the current address of highest priority; and b. means connecting said control means to said selection means whereby said selection means is controlled by particular ones of said control functions provided by said control means.

8. Apparatus according to claim 1, wherein said local storage means comprises a plurality of registers and wherein said apparatus further comprises:

a. means connected to said control means and to said local storage means for selecting a register from a group of registers in said local storage means as determined by a function provided by said control means;

b. means connected to said control means for selecting an increment value from a plurality of sources as determined by a function provided by said control means; and c. means connected to said register selecting means and said increment value selecting means for adding a selected increment value to the contents of a selected register and for placing the result in the selected register.

9. Apparatus according to claim 8 wherein said register selecting means includes means for selecting a register selecting quantity from a plurality of sources as determined by said function provided by said control means.

10. Apparatus according to claim 1 further including:

a. main memory means;

b. means connecting said main memory means to said local storage means;

c. said connecting means including means for varying the format of instruction words transmitted from said main memory means in accordance with parameters supplied thereto;

d. storage means containing said parameters; and e. means connecting said control means to said format varying means and to said storage means for selecting parameters and controlling said format varying means in accordance with function provided by said control means.

11. Apparatus according to claim 1, further including:

a. main memory means;

b. means connecting said main memory means to said local storage means; and c. said connecting means including indicating means for providing signals whenever information transmitted from said local storage means is attempted to be stored at an address in said main memory means outside of a predetermined address range.

12. A method of controlling a microprogram comprising the steps of:

a. storing microinstructions each including an operation code in a first storage means;

b. fetching a microinstruction from said first storage means and utilizing the operation code thereof to form an address;

c. fetching an instruction from a second storage means in a manner utilizing said address formed from said operation code;

d. gating the instruction fetched from said second storage means to a control means in a manner placing a portion of the bits of said instruction in a storage register means to form a vector of a first type and placing the remaining bits of said instruction in shift register means to form a plurality of vectors of a second type; and e. shifting said shift register means to concatenate sequentially each of said second vectors with said first vector to provide control signals for executing the instruction to control said computer.

13. A method according to claim 12, further including providing a priority schedule of addresses including said address formed from said operation code, and wherein said step of fetching an instruction from said second storage means is performed at an address of the highest priority according to said schedule.

14. In a microprogram computer having operation means for performing controlled operations on information supplied thereto, the improvement comprising:

a. a vertically structured control memory containing a plurality of vertical microinstructions each having an operation code field and supporting parameter fields, the operation code field of each microinstruction being coded to select a set of control functions stored in the computer whereby said microinstructions comprise a microprogram for controlling the computer at a first level of program storage, the supporting parameter fields serving as immediate selection values or operands for the microinstructions;

b. means for fetching selected microinstructions from said control memory;

c. a horizontally structured memory containing a plurality of horizontal words, each word containing a number of bits which is at least a binary order of magnitude greater than the number of bits in each microinstruction contained in said control memory, the bits of each of said horizontal words serving to provide control signals to hardware components of said computer, there being at least one horizontal word corresponding to each microinstruction contained in said control memory for providing an instruction set for executing the selected microinstruction whereby said horizontal words comprise a program for controlling the computer at a second level of program storage;

d. register means connected to the output of said control memory for receiving each microinstruction fetched from said control memory, said register means having a portion for said operation code field and a portion for said supporting parameter fields;

e. means connected to said portion of said register means for said operation code field and to said horizontally structured memory for fetching words from said horizontally structured memory in accordance with the operation codes of microinstructions fetched from said control memory;

f. means connected to the output of said horizontally structured memory and to said operation means for gating the words selected from said memory in a manner such that the bits in said words provide control signals to the hardware components of said computer for executing machine instructions for said computer according to said microprogram in said control memory under vertical control wherein the operation codes of said microinstructions specify a set of control microinstructions through said program in said horizontally structured memory which executes said microinstructions; and g. means connected to the portion of said register means for said supporting parameter fields and to said gating means and to said operation means for controlling the utilization of said fields as determined by said control signals.

15. Apparatus according to claim 14, wherein said means connected to the output of said horizontally structured memory comprises:

a. means for providing control signals of a first type having a given execution time duration; and b. means for providing control signals of a second type comprising a plurality of signals presented in a sequence, said signals having execution time durations which in sum equal the time duration of the control signals of the first type.

16. Apparatus according to claim 14, wherein said means connected to the output of said horizontally structured memory comprises:

a. storage register means into which a portion of the bits of a selected word are placed to provide control signals of a first type;

b. shift register means into which the remaining bits of the selected word are placed to provide control signals of a second type; and c. timing means connected to said storage register means and to said shift register means whereby said control signals of the second type are generated in a sequence while said control signals of the first type are generated and held constant.

* * * * *

PRINTER'S TRIM LINE

UNITED STATES PATENT OFFICE

CERTIFICATE OF CORRECTION

Patent No. 3,766,532 Dated October 16, 1973

Inventor(s) John T. Liebel, Jr.

It is certified that error appears in the above-identified patent and that said Letters Patent are hereby corrected as shown below:

In claim 2, column 41, line 1 "postions" should be --positions--.

In claim 14, column 44, line 21, "microinstructions" should be --signals--.

Signed and sealed this 2nd day of April 1974.

(SEAL)
Attest:

EDWARD M.FLETCHER,JR.
Attesting Officer

C. MARSHALL DANN
Commissioner of Patents